(12) United States Patent
Sakata et al.

(10) Patent No.: US 10,181,761 B2
(45) Date of Patent: Jan. 15, 2019

(54) WIRELESS POWER TRANSMISSION SYSTEM

(71) Applicant: Panasonic Intellectual Property Management Co., Ltd., Osaka (JP)

(72) Inventors: Tsutomu Sakata, Osaka (JP); Hiroshi Kanno, Osaka (JP); Eiji Takahashi, Nara (JP); Satoru Kikuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 58 days.

(21) Appl. No.: 15/629,974

(22) Filed: Jun. 22, 2017

(65) Prior Publication Data

US 2017/0288474 A1 Oct. 5, 2017

Related U.S. Application Data

(63) Continuation of application No. PCT/JP2016/003182, filed on Jul. 4, 2016.

(30) Foreign Application Priority Data

Oct. 2, 2015 (JP) .................................. 2015-196732
Jun. 24, 2016 (JP) .................................. 2016-125424

(51) Int. Cl.
*H01F 27/42* (2006.01)
*H01F 37/00* (2006.01)
(Continued)

(52) U.S. Cl.
CPC .............. *H02J 50/80* (2016.02); *H02J 50/12* (2016.02); *H02J 50/40* (2016.02); *H02J 50/50* (2016.02); *H04B 5/02* (2013.01)

(58) Field of Classification Search
CPC .. H02J 50/80; H02J 50/12; H02J 50/50; H02J 50/40; H04B 5/02
See application file for complete search history.

(56) References Cited

U.S. PATENT DOCUMENTS

2011/0211595 A1* 9/2011 Geirhofer .............. H04B 7/155
                                                                  370/478
2012/0001485 A1* 1/2012 Uchida .................. H02J 7/025
                                                                  307/11
(Continued)

FOREIGN PATENT DOCUMENTS

EP          2793355 A1      10/2014
JP          2010-154592     7/2010
JP          2013-169100 A   8/2013

OTHER PUBLICATIONS

The Extended European Search Report dated Jun. 14, 2018 for the related European Patent Application No. 16850540.2.
(Continued)

*Primary Examiner* — Alfonso Perez Borroto
*Assistant Examiner* — Esayas Yeshaw
(74) *Attorney, Agent, or Firm* — Renner Otto Boisselle & Sklar, LLP

(57) ABSTRACT

A relay apparatus in a wireless power transmission system includes a relay power reception antenna that receives power transmission alternating current power from a power transmission power transmission antenna, a relay rectifier that converts the power transmission alternating current power into relay direct current power, a relay inverter circuit that converts the relay direct current power into relay alternating current power, and a relay power transmission antenna that wirelessly transmits the relay alternating current power. When the relay apparatus has received binary relay received data, the relay apparatus reverses a sign of the binary relay received data and eliminates a difference between a first voltage of the relay direct current power and a second voltage of the relay direct current power on the basis of the reversed binary relay received data.

9 Claims, 23 Drawing Sheets

(51) Int. Cl.
*H01F 38/00* (2006.01)
*H02J 50/80* (2016.01)
*H02J 50/12* (2016.01)
*H04B 5/02* (2006.01)
*H02J 50/40* (2016.01)
*H02J 50/50* (2016.01)

(56) References Cited

U.S. PATENT DOCUMENTS

| | | | | |
|---|---|---|---|---|
| 2012/0202435 A1* | 8/2012 | Kim | ............... | H04B 5/0037 |
| | | | | 455/69 |
| 2012/0262950 A1* | 10/2012 | Nate | ............... | H02J 9/005 |
| | | | | 363/16 |
| 2012/0306284 A1* | 12/2012 | Lee | ............... | H02J 17/00 |
| | | | | 307/104 |
| 2013/0264997 A1* | 10/2013 | Lee | ............... | H04B 5/0037 |
| | | | | 320/106 |
| 2013/0293028 A1* | 11/2013 | Byun | ............... | H01F 38/14 |
| | | | | 307/104 |
| 2014/0091635 A1 | 4/2014 | Sugino et al. | | |
| 2014/0239733 A1* | 8/2014 | Mach | ............... | H02J 5/005 |
| | | | | 307/104 |

OTHER PUBLICATIONS

International Search Report of PCT application No. PCT/JP2016/003182 dated Aug. 30, 2016.

* cited by examiner $\phi = 0°$ $\phi = 90°$

Duty 50%

Duty 25%

WIRELESS POWER TRANSMISSION SYSTEM

BACKGROUND

1. Technical Field

The present disclosure relates to a wireless power transmission system that wirelessly transmits power.

2. Description of the Related Art

During these years, wireless (noncontact) power transmission techniques for wirelessly (in a noncontact manner) transmitting power to mobile devices such as mobile phones and electric vehicles are being developed. Japanese Unexamined Patent Application Publication No. 2010-154592, for example, discloses a noncontact power transmission system that transmits power through magnetic resonance. This system includes a power transmission apparatus and a plurality of power reception apparatuses. It is disclosed that power can be transmitted even to a power reception apparatus outside a reachable range of power from the power transmission apparatus through magnetic resonance between coils of the plurality of power reception apparatuses. Japanese Unexamined Patent Application Publication No. 2010-154592 also discloses that each power reception apparatus can transmit data to the power transmission apparatus using a method such as amplitude modulation.

SUMMARY

There is, however, room for improvement in the existing art in terms of data communication during power transmission.

In one general aspect, the techniques disclosed here feature a wireless power transmission system including a power transmission apparatus, a power reception apparatus, and a relay apparatus arranged between the power transmission apparatus and the power reception apparatus. The power transmission apparatus includes a power transmission inverter circuit that converts power transmission direct current power supplied from an external power supply into power transmission alternating current power and a power transmission power transmission antenna that wirelessly transmits the obtained power transmission alternating current power. The relay apparatus includes a relay power reception antenna that is electromagnetically coupled with the power transmission power transmission antenna and that receives the transmitted power transmission alternating current power, a relay rectifier that converts the received power transmission alternating current power into relay direct current power, a relay inverter circuit that converts the relay direct current power into relay alternating current power, and a relay power transmission antenna that wirelessly transmits the obtained relay alternating current power. The power reception apparatus includes a power reception power reception antenna that is electromagnetically coupled with the relay power transmission antenna and that receives the transmitted relay alternating current power, a power reception rectifier that converts the relay alternating current power received by the power reception power reception antenna into power reception direct current power, and a power reception amplitude modulator that transmits binary power reception transmission data to the relay apparatus through the electromagnetic coupling between the power reception power reception antenna and the relay power reception antenna by varying amplitude of voltage of the relay alternating current power received by the power reception power reception antenna between a first amplitude and a second amplitude. The relay apparatus also includes a relay demodulator that is connected to the relay power transmission antenna and that receives binary relay received data by demodulating the binary power reception transmission data on the basis of a change in the voltage of the relay alternating current power input to the relay power transmission antenna and a relay reverse control circuit that reverses a sign of the binary relay received data received by the relay demodulator and that performs, using the relay amplitude modulator, control for eliminating a difference between a first voltage of the relay direct current power, which corresponds to the first amplitude, and a second voltage of the relay direct current power, which corresponds to the second amplitude, on the basis of the reversed binary relay received data.

According to the aspect of the present disclosure, a wireless power transmission system can be achieved that hardly propagates an effect of data communication to another apparatus during power transmission.

It should be noted that general or specific embodiments may be implemented as a system, a method, an integrated circuit, a computer program, or a recording medium. Alternatively, the general or specific aspects may be implemented as an arbitrary combination of a system, an apparatus, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of Present Disclosure

Underlying knowledge forming the basis of the present disclosure will be described before describing embodiments of the present disclosure.

Figure 1:
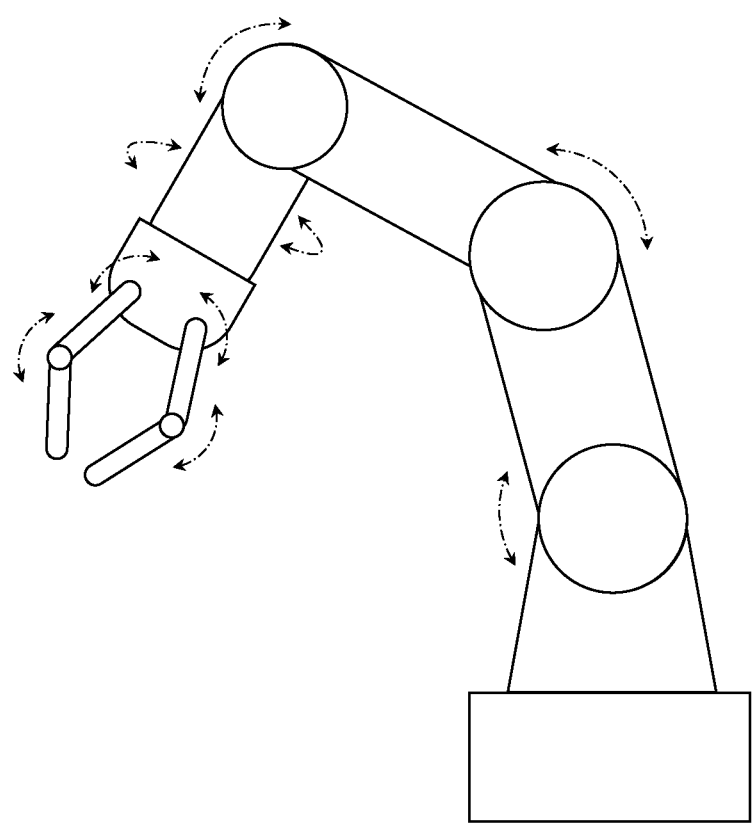
FIG. 1 is a diagram illustrating an example of a wireless power transmission system including a plurality of loads.

The present inventors have examined a wireless power transmission system employing multistage connection (also referred to as "cascade connection"), in which one or more relay apparatuses are provided between a power transmission apparatus and a power reception apparatus and a plurality of loads are driven. Such a wireless power transmission system can be suitably used for a device including a plurality of loads (e.g., motors), such as a robot arm illustrated in FIG. 1. In the robot arm illustrated in FIG. 1, a plurality of parts are rotated or moved by motors. Power, therefore, needs to be individually supplied to each motor to control the robot arm.

In such a device including a plurality of movable parts, a power supply supplies, in the existing art, power to loads through a large number of cables. With this configuration, however, there are problems that an accident tends to happen due to cables tangled up together, that a movable range is limited, and that it is difficult to replace parts. The present inventors, therefore, have attempted to supply power to loads from a power supply through wireless power transmission and eliminate cables extending from the power supply.

Figure 2A:
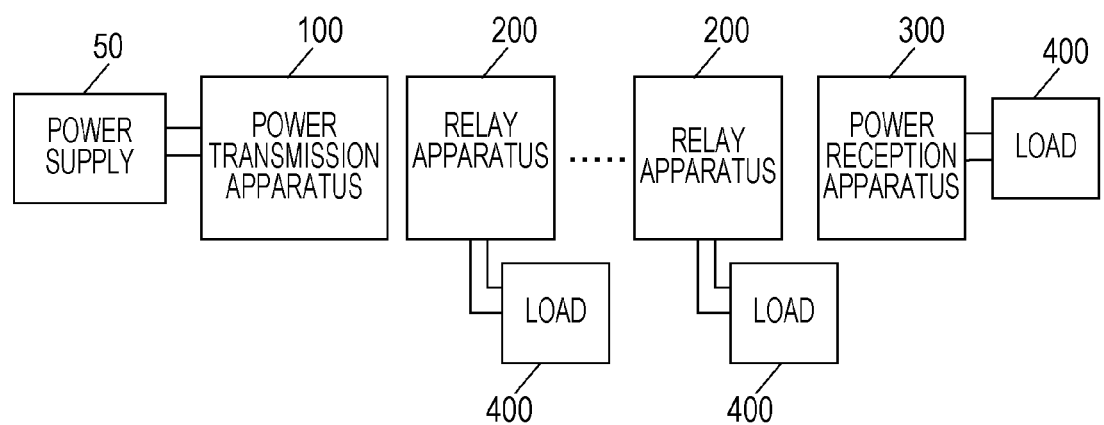
FIG. 2A is a block diagram schematically illustrating an example of a wireless power transmission system.

FIG. 2A is a block diagram schematically illustrating an example of such a wireless power transmission system. In this system, a power transmission apparatus 100 connected to a power supply 50 wirelessly transmits power to a power reception apparatus 300 through a plurality of relay apparatuses 200. Each of the plurality of relay apparatuses 200 and the power reception apparatus 300 is connected to a load 400 and supplies a part of the received power to the load 400. Each relay apparatus 200 supplies power to the connected load 400 and transmits power to an apparatus in a subsequent stage (an adjacent relay apparatus 200 or the power reception apparatus 300) in a noncontact manner. It is to be noted that a stage closer to a power transmission apparatus than a relay apparatus in question will be expressed as a "previous stage", and a stage closer to a power reception apparatus than the relay apparatus in question will be expressed as a "next stage" herein.

Power transmission between apparatuses is performed by a power transmission antenna and a power reception antenna. The power transmission apparatus 100 includes a power transmission antenna, and the power reception apparatus 300 includes a power reception antenna. Each relay apparatus 200 includes both a power reception antenna and a power transmission antenna. Each antenna can be achieved, for example, by a resonant circuit including a coil and a capacitor or a circuit including a pair of electrodes. The former is used for power transmission through magnetic field coupling, and the latter is used for power transmission through electric field coupling.

Each load 400 is not limited to a motor and can be an arbitrary load such as a camera or a lighting device. Each load 400 is driven by power from the connected relay apparatus 200 or power reception apparatus 300.

Figure 2B:
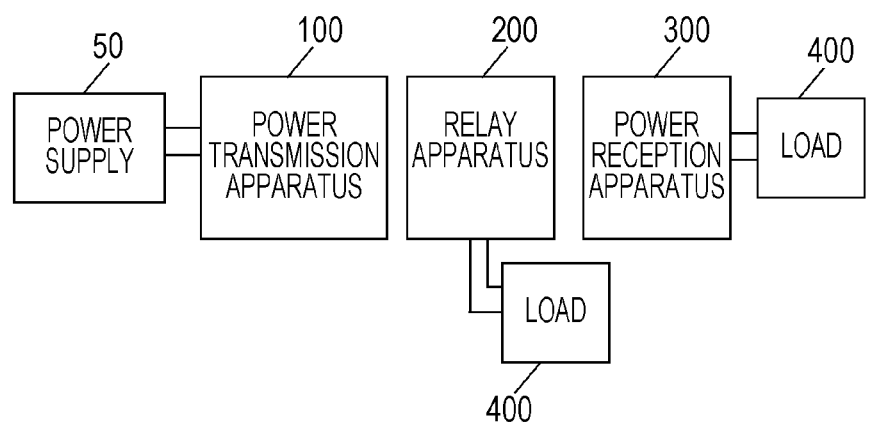
FIG. 2B is a block diagram schematically illustrating another example of the wireless power transmission system.

Although the system illustrated in FIG. 2A includes a plurality of relay apparatus 200, the number of relay apparatuses 200 may be one. FIG. 2B illustrates an example of a wireless power transmission system in which a relay apparatus 200 is provided between a power transmission apparatus 100 and a power reception apparatus 300.

With this configuration, the power transmission apparatus 100 wirelessly transmits power to the power reception apparatus 300 through at least one relay apparatus 200. Power can be individually supplied to each load 400 without using cables connecting a power supply 50 and a plurality of loads 400.

In such a wireless power transmission system, information is preferably transmitted between the power transmission apparatus 100, the relay apparatuses 200, and the power reception apparatus 300 in order to perform operations safely and stably. For example, information indicating variation in a voltage or power supplied to each load 400, information specifying stopping of power transmission at a time of occurrence of an abnormality in each load 400, or the like can be transmitted from each of the relay apparatuses 200 and the power reception apparatus 300 to an apparatus in a previous stage. Upon receiving the information, the apparatus in the previous stage can adjust a value of power to be transmitted or stop transmitting power. The transmission of information can be performed, for example, using a load modulation method in which a value of a load in a circuit is varied using a switch device. By varying the load and changing the amplitude of voltage in a circuit of an apparatus in a previous stage, information (data) can be transmitted. An example of the transmission of data through amplitude modulation is disclosed, for example, in Japanese Unexamined Patent Application Publication No. 2010-154592.

The present inventors, however, have found that the following problem arises when data communication through amplitude modulation in the existing art is used in a wireless power transmission system including relay apparatuses 200. In order to explain the problem, first, an example of the configuration and operation of the relay apparatus 200 will be described.

Figure 3:
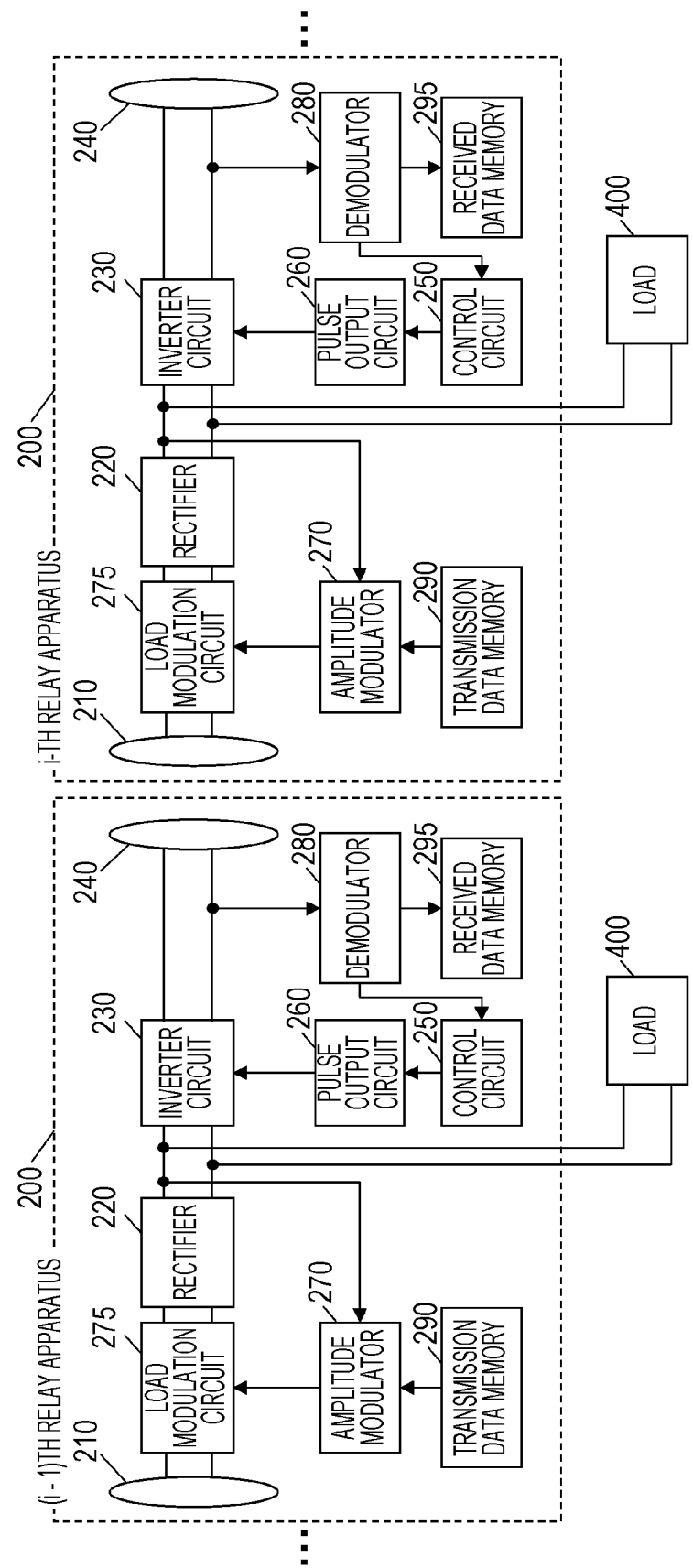
FIG. 3 is a block diagram illustrating an example (comparative example) of the configuration of relay apparatuses having a function of communicating data through amplitude modulation.

FIG. 3 is a block diagram illustrating an example (comparative example) of the configuration of relay apparatuses 200 having a function of communicating data through amplitude modulation. As illustrated in FIG. 2A, a wireless power transmission system including a plurality of relay apparatuses 200 is assumed here. The number of relay apparatuses 200 is denoted by N (N is an integer equal to or larger than 2), and the N relay apparatuses 200 sorted as first to N-th relay apparatuses in descending order of closeness to a power transmission apparatus 100 are assumed. FIG. 3 illustrates an (i−1)th (i=2 to N) relay apparatus and an i-th relay apparatus among the N relay apparatuses 200. The other relay apparatuses that are not illustrated have the same configuration.

Each relay apparatus 200 includes a power reception antenna 210, a rectifier (rectifier circuit) 220, an inverter circuit 230, and a power transmission antenna 240. The power reception antenna 210 receives alternating current power transmitted from a power transmission antenna of an apparatus in a previous stage (the power transmission apparatus 100 or another relay apparatus 200). The rectifier 220 converts the alternating current power received by the power reception antenna 210 into direct current power and outputs the direct current power. A part of the direct current power output from the rectifier 220 is supplied to a load 400, and another part is supplied to the inverter circuit 230. The inverter circuit 230 converts the direct current power output from the rectifier 220 into alternating current power and supplies the alternating current power to the power transmission antenna 240. The power transmission antenna 240 transmits the alternating current power to an apparatus in a subsequent stage (an adjacent relay apparatus 200 or the power reception apparatus 300). The inverter circuit 230 is controlled by a control circuit 250 and a pulse output circuit 260.

Each relay apparatus 200 also includes, as components for transmitting data to the apparatus in the previous stage, an amplitude modulator 270 that modulates the amplitude of the voltage of the alternating current power received by the power reception antenna 210 in accordance with binary transmission data and a transmission data memory 290 storing binary transmission data. The amplitude modulator 270 modulates the amplitude of the voltage of the alternating current power output from the power reception antenna 210 by, for example, controlling a switch device in a load modulation circuit 275 connected to the rectifier 220. An effect of the modulation is propagated to the apparatus in the previous stage, and data is transmitted.

On the other hand, each relay apparatus 200 also includes a demodulator 280 as a component for receiving data transmitted from the apparatus in the subsequent stage through the amplitude modulation described above. The demodulator 280 reads data transmitted from the apparatus in the subsequent stage by detecting changes in the amplitude of the voltage of the alternating current power output from the inverter circuit 230. The read data is stored in a received data memory 295 as received data.

With this configuration, each relay apparatus 200 can transmit data to the apparatus in the previous stage and receive data from the apparatus in the subsequent stage. If the amplitude of the alternating current voltage input to the inverter circuit 230 is varied to transmit data to the apparatus in the previous stage, however, a problem arises that an effect of the variation propagates to the alternating current power output from the inverter circuit 230 to the power transmission antenna 240 and the demodulator 280 incorrectly receives the data.

Figure 4:
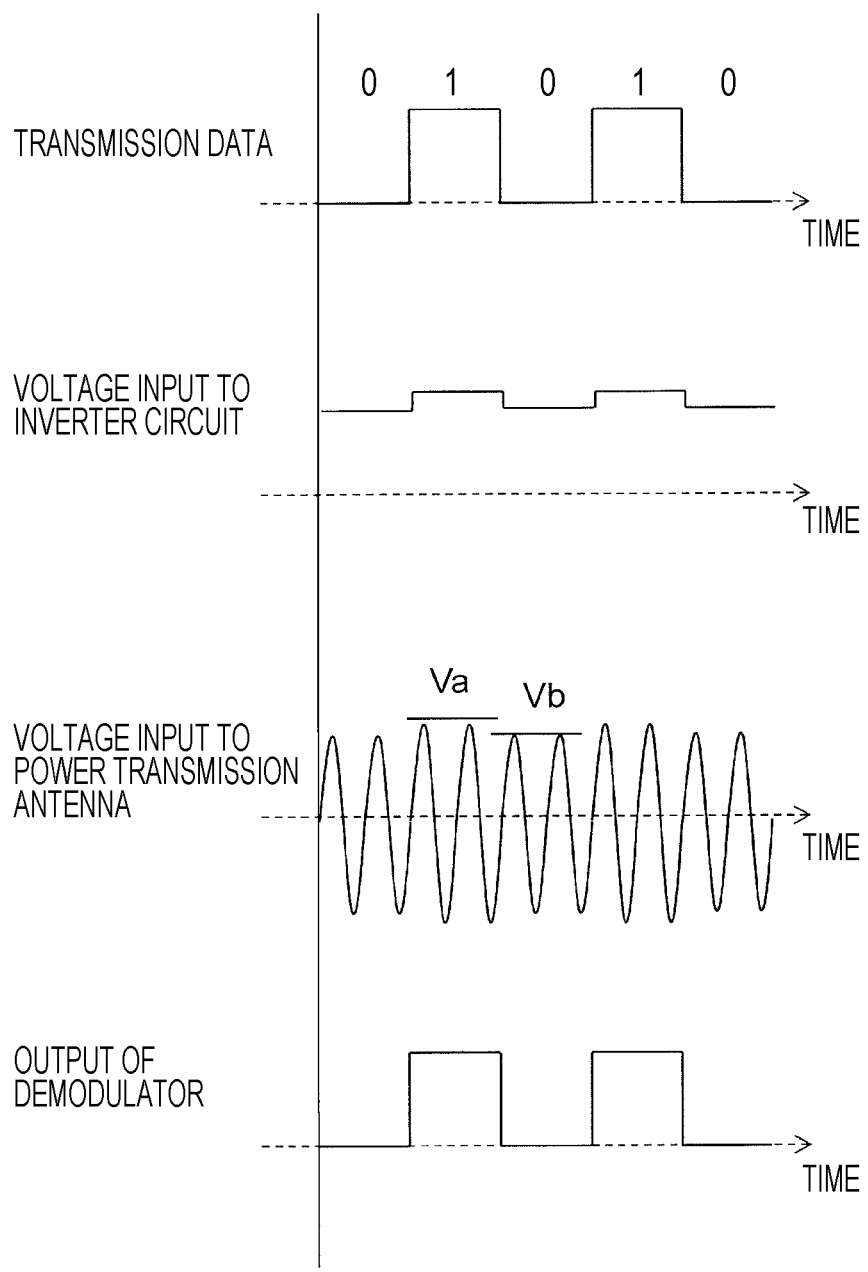
FIG. 4 is a diagram illustrating a problem at a time of data transmission.

FIG. 4 is a diagram illustrating the problem. FIG. 4 illustrates an example of temporal changes in binary transmission data transmitted from a relay apparatus (e.g., an i-th relay apparatus) 200 to a previous stage, a voltage input to the inverter circuit 230, a voltage input to the power transmission antenna 240, and received data output from the demodulator 280. Here, only the relay apparatus 200 in question is transmitting data to an apparatus in the previous stage, and an apparatus in a subsequent stage is not transmitting data to the relay apparatus 200 in question or the relay apparatus 200 in question is not transmitting data to the apparatus in the subsequent stage.

When a value of the transmission data is 0, switches illustrated in FIG. 8A, which will be described later, are turned on, and when the value of the transmission data is 1, the switches illustrated in FIG. 8A, which will be described later, are turned off. When the value of the transmission data is 1, the amplitude of the voltage of alternating current power input to the rectifier 220 becomes larger than when the value of the transmission data is 0. A value of the direct current voltage input to the inverter circuit 230 from the rectifier 220, therefore, is larger when the value of the transmission data is 1 than when the value of the transmission data is 0. Similarly, an amplitude Va of the alternating current voltage input from the inverter circuit 230 to the power transmission antenna 240 when the value of the transmission data is 1 is larger than an amplitude Vb when the value of the transmission data is 0. As a result, the demodulator 280 detects changes in the amplitude although data is not being transmitted from the subsequent stage, and incorrectly receives data.

An effect of the amplitude modulation performed by the amplitude modulator 270 propagates to a relay apparatus 200 or the power reception apparatus 300 in a subsequent stage. The above problem of interference, therefore, can occur not only in a relay apparatus 200 that has transmitted data but also in another relay apparatus 200 or the power reception apparatus 300 in the subsequent stage. That is, while a relay apparatus 200 is transmitting data to an apparatus in a previous stage, not only data communication performed by the relay apparatus 200 but also data communication performed by an apparatus in a subsequent stage is affected.

A similar problem can arise not only when data is transmitted but also when data is received.

Figure 5:
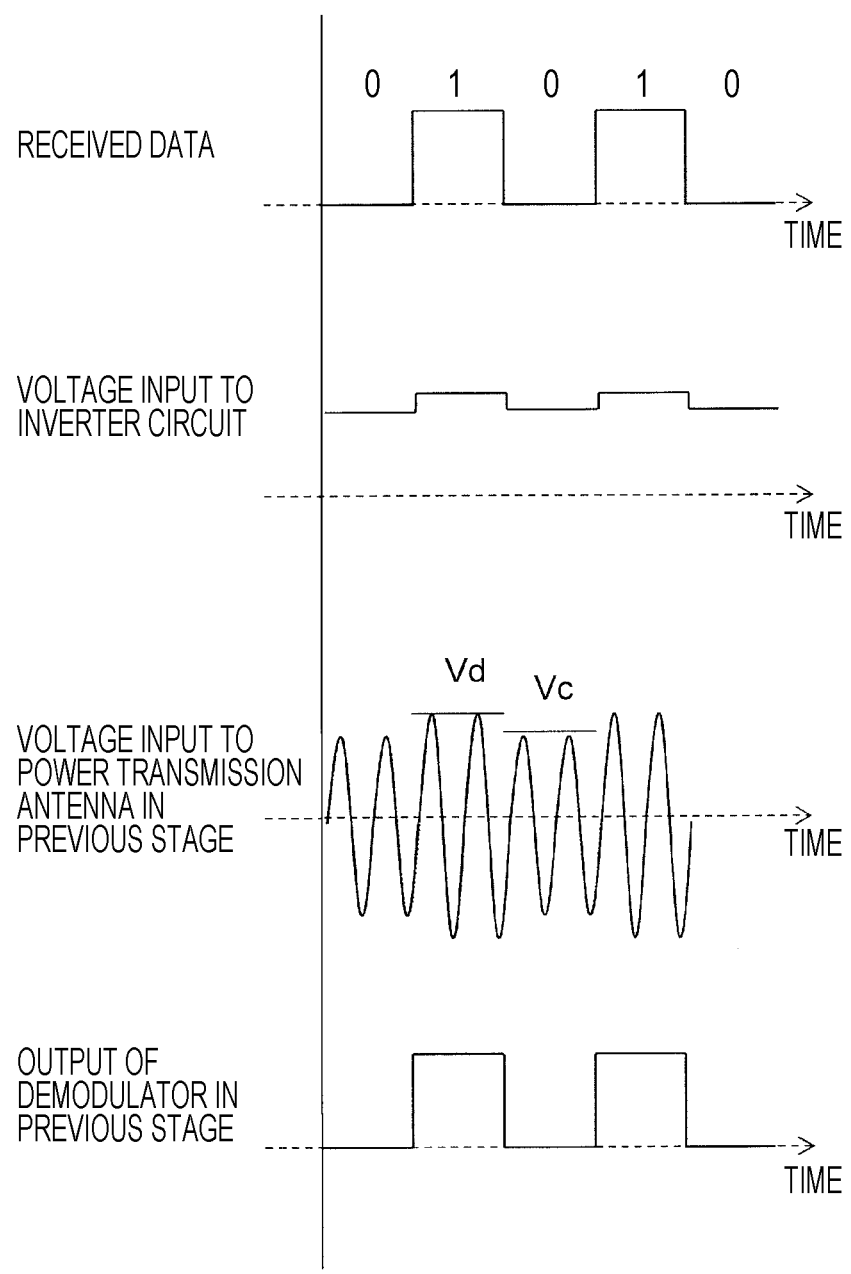
FIG. 5 is a diagram illustrating a problem at a time of data reception.

FIG. 5 is a diagram illustrating a problem at a time of data reception. FIG. 5 illustrates an example of temporal changes in received data transmitted to a certain relay apparatus (e.g., an i-th relay apparatus) 200 from a subsequent stage, a voltage input to the inverter circuit 230 of the relay apparatus 200, a voltage input to the power transmission antenna of an apparatus in a previous stage, and received data output from the demodulator of the apparatus in the previous stage. Here, it is assumed that the relay apparatus 200 is only receiving data and is not transmitting data to the apparatus in the previous stage. When the received data is 1, voltage in the relay apparatus 200 and a circuit of the apparatus in the previous stage is generally higher than when the received data is 0. The direct current voltage input to the inverter circuit 230, therefore, is higher when the received data is 1 than when the received data is 0. Similarly, an amplitude Vd of the alternating current voltage input to the power transmission antenna of the apparatus in the previous stage is higher when the received data is 1 than an amplitude Vc when the received data is 0.

As a result, the demodulator of the apparatus in the previous stage detects the variation between the amplitude Vd and the amplitude Vc and receives the same data. The reception of the same data can also occur in an apparatus in a yet earlier stage, and consequently interferes with data communication performed by the apparatus in the yet earlier stage.

The present inventors have identified the above two problems that arise when data is transmitted and received and examined a configuration for solving these problems. As a result, the present inventors have found that at least one of the two problems can be solved by introducing, into a relay apparatus, control for eliminating variation in the amplitude of alternating current voltage caused by data communication. Aspects of the present disclosure will be described hereinafter.

A wireless power transmission system according to an aspect of the present disclosure is a wireless power transmission system including:
a power transmission apparatus;
a power reception apparatus; and
a relay apparatus arranged between the power transmission apparatus and the power reception apparatus,
in which the power transmission apparatus includes
a power transmission inverter circuit that converts power transmission direct current power supplied from an external power supply into power transmission alternating current power, and a power transmission power transmission antenna that wirelessly transmits the obtained power transmission alternating current power,
in which the relay apparatus includes
a relay power reception antenna that is electromagnetically coupled with the power transmission power transmission antenna and that receives the transmitted power transmission alternating current power,
a relay rectifier that converts the received power transmission alternating current power into relay direct current power,
a relay inverter circuit that converts the relay direct current power into relay alternating current power, and
a relay power transmission antenna that wirelessly transmits the obtained relay alternating current power,
in which the power reception apparatus includes
a power reception power reception antenna that is electromagnetically coupled with the relay power transmission antenna and that receives the transmitted relay alternating current power, and
in which the relay apparatus includes
a relay amplitude modulator that, when the relay apparatus transmits binary relay transmission data to the power transmission apparatus through the electromagnetic coupling between the relay power reception antenna and the power transmission power transmission antenna, varies amplitude of voltage of the power transmission alternating current power received by the relay power reception antenna between a first amplitude and a second amplitude, and
a relay control circuit that performs, using the relay inverter circuit, control for eliminating a difference between a third amplitude of the relay alternating current power, which corresponds to the first amplitude, and a fourth amplitude of the relay alternating current power, which corresponds to the second amplitude.

According to the above aspect,
the relay apparatus includes
a relay amplitude modulator that, when the relay apparatus transmits binary relay transmission data to the power transmission apparatus through the electromagnetic coupling between the relay power reception antenna and the power transmission power transmission antenna, varies amplitude of voltage of the power transmission alternating current power received by the relay power reception antenna between a first amplitude and a second amplitude, and
a relay control circuit that performs, using the relay inverter circuit, control for eliminating a difference between a third amplitude of the relay alternating current power, which corresponds to the first amplitude, and a fourth amplitude of the relay alternating current power, which corresponds to the second amplitude.

As a result, even if the relay amplitude modulator is transmitting binary relay transmission data, the amplitude of the relay alternating current power output from the relay inverter circuit hardly varies. The problem of interference described with reference to FIG. 4, therefore, can be solved. It is to be noted that "eliminating a difference" does not mean that the difference becomes exactly zero (0), but there may be a slight difference.

A wireless power transmission system according to another aspect of the present disclosure is
a wireless power transmission system including:
a power transmission apparatus;
a power reception apparatus; and
N (N is an integer equal to or larger than 2) relay apparatuses that are arranged between the power transmission apparatus and the power reception apparatus and that are sorted as first to N-th relay apparatuses in descending order of closeness to the power transmission apparatus, in which the power transmission apparatus includes a power transmission inverter circuit that converts power transmission direct current power supplied from an external power supply into power transmission alternating current power, and a power transmission power transmission antenna that wirelessly transmits the obtained power transmission alternating current power, in which the first one of the N relay apparatuses includes a first relay power reception antenna that is electromagnetically coupled with the power transmission power transmission antenna and that receives the transmitted power transmission alternating current power, a first relay rectifier that converts the received power transmission alternating current power into first relay direct current power, a first relay inverter circuit that converts the first relay direct current power into first relay alternating current power, and a first relay power transmission antenna that wirelessly transmits the obtained first relay alternating current power, in which an i-th (i=2 to N) one of the N relay apparatuses includes an i-th relay power reception antenna that is electromagnetically coupled with an (i−1)th relay power transmission antenna and that receives (i−1)th relay alternating current power, an i-th relay rectifier that converts the received (i−1)th relay alternating current power into i-th relay direct current power, an i-th relay inverter circuit that converts the i-th relay direct current power into i-th relay alternating current power, and an i-th relay power transmission antenna that wirelessly transmits the obtained i-th relay alternating current power, in which the power reception apparatus includes a power reception power reception antenna that is electromagnetically coupled with an N-th relay power transmission antenna and that receives N-th relay alternating current power, and in which the i-th (i=2 to N) relay apparatus includes an i-th relay amplitude modulator that, when the i-th relay apparatus transmits binary i-th relay transmission data to the (i−1)th relay apparatus through the electromagnetic coupling between the i-th relay power reception antenna and the (i−1)th relay power transmission antenna, varies amplitude of voltage of the (i−1)th relay alternating current power received by the i-th relay power reception antenna between a first amplitude and a second amplitude, and an i-th relay control circuit that performs, using the i-th relay inverter circuit, control for eliminating a difference between a third amplitude of the i-th relay alternating current power, which corresponds to the first amplitude, and a fourth amplitude of the i-th relay alternating current power, which corresponds to the second amplitude.

According to the above aspect, the i-th (i=2 to N) relay apparatus includes an i-th relay amplitude modulator that, when the i-th relay apparatus transmits binary i-th relay transmission data to the (i−1)th relay apparatus through the electromagnetic coupling between the i-th relay power reception antenna and the (i−1)th relay power transmission antenna, varies amplitude of voltage of the (i−1)th relay alternating current power received by the i-th relay power reception antenna between a first amplitude and a second amplitude, and an i-th relay control circuit that performs, using the i-th relay inverter circuit, control for eliminating a difference between a third amplitude of the i-th relay alternating current power, which corresponds to the first amplitude, and a fourth amplitude of the i-th relay alternating current power, which corresponds to the second amplitude.

As a result, even if the i-th relay amplitude modulator is transmitting the binary i-th relay transmission data in the wireless power transmission system including the plurality of relay apparatuses, the amplitude of the relay alternating current power output from the i-th relay inverter circuit hardly varies. The problem of interference described with reference to FIG. 4, therefore, can be solved.

A wireless power transmission system according to yet another aspect of the present disclosure is a wireless power transmission system including:

a power transmission apparatus;

a power reception apparatus; and a relay apparatus arranged between the power transmission apparatus and the power reception apparatus, in which the power transmission apparatus includes a power transmission inverter circuit that converts power transmission direct current power supplied from an external power supply into power transmission alternating current power, and a power transmission power transmission antenna that wirelessly transmits the obtained power transmission alternating current power, in which the relay apparatus includes a relay power reception antenna that is electromagnetically coupled with the power transmission power transmission antenna and that receives the transmitted power transmission alternating current power, a relay rectifier that converts the received power transmission alternating current power into relay direct current power, a relay inverter circuit that converts the relay direct current power into relay alternating current power, and a relay power transmission antenna that wirelessly transmits the obtained relay alternating current power, in which the power reception apparatus includes a power reception power reception antenna that is electromagnetically coupled with the relay power transmission antenna and that receives the transmitted relay alternating current power, a power reception rectifier that converts the relay alternating current power received by the power reception power reception antenna into power reception direct current power, and a power reception amplitude modulator that transmits binary power reception transmission data to the relay apparatus through the electromagnetic coupling between the power reception power reception antenna and the relay power reception antenna by varying amplitude of voltage of the relay alternating current power received by the power reception power reception antenna between a first amplitude and a second amplitude, and in which the relay apparatus also includes a relay demodulator that is connected to the relay power transmission antenna and that receives binary relay received data by demodulating the binary power reception transmission data on the basis of a change in the voltage of the relay alternating current power input to the relay power transmission antenna, and a relay reverse control circuit that reverses a sign of the binary relay received data received by the relay demodulator and that performs, using the relay amplitude modulator, control for eliminating a difference between a first voltage of the relay direct current power, which corresponds to the first amplitude, and a second voltage of the relay direct current power, which corresponds to the tenth amplitude, on the basis of the reversed binary relay received data.

According to the above aspect, the relay apparatus includes a relay demodulator that is connected to the relay power transmission antenna and that receives binary relay received data by demodulating the binary power reception transmission data on the basis of a change in the voltage of the relay alternating current power input to the relay power transmission antenna, and a relay reverse control circuit that reverses a sign of the binary relay received data received by the relay demodulator and that performs, using the relay amplitude modulator, control for eliminating a difference between a first voltage of the relay direct current power, which corresponds to the first amplitude, and a second voltage of the relay direct current power, which corresponds to the tenth amplitude, on the basis of the reversed binary relay received data.

As a result, the difference between the first voltage and the second voltage of the relay direct current power when the power reception amplitude modulator is transmitting data the power reception transmission data can be almost perfectly eliminated. The unnecessary reception of data by an apparatus in a previous stage described with reference to FIG. 5, therefore, can be prevented.

A wireless power transmission system according to yet another aspect of the present disclosure is a wireless power transmission system including:

a power transmission apparatus;

a power reception apparatus; and

N (N is an integer equal to or larger than 2) relay apparatuses that are arranged between the power transmission apparatus and the power reception apparatus and that are sorted as first to N-th relay apparatuses in descending order of closeness to the power transmission apparatus, in which the power transmission apparatus includes a power transmission inverter circuit that converts power transmission direct current power supplied from an external power supply into power transmission alternating current power, and a power transmission power transmission antenna that wirelessly transmits the obtained power transmission alternating current power, in which the first one of the N relay apparatuses includes a first relay power reception antenna that is electromagnetically coupled with the power transmission power transmission antenna and that receives the transmitted power transmission alternating current power, a first relay rectifier that converts the received power transmission alternating current power into first relay direct current power, a first relay inverter circuit that converts the first relay direct current power into first relay alternating current power, and a first relay power transmission antenna that wirelessly transmits the obtained first relay alternating current power, in which an i-th (i=2 to N) one of the N relay apparatuses includes an i-th relay power reception antenna that is electromagnetically coupled with an (i−1)th relay power transmission antenna and that receives (i−1)th relay alternating current power, an i-th relay rectifier that converts the received (i−1)th relay alternating current power into i-th relay direct current power, an i-th relay inverter circuit that converts the i-th relay direct current power into i-th relay alternating current power, and an i-th relay power transmission antenna that wirelessly transmits the obtained i-th relay alternating current power, in which the power reception apparatus includes a power reception power reception antenna that is electromagnetically coupled with an N-th relay power transmission antenna and that receives N-th relay alternating current power, and a power reception rectifier that converts the N-th relay alternating current power received by the power reception power reception antenna into power reception direct current power, and in which the first relay apparatus also includes a first relay amplitude modulator that transmits binary first relay transmission data to the power transmission apparatus through electromagnetic coupling between the first relay power reception antenna and the power transmission power transmission antenna by varying amplitude of voltage of the power transmission alternating current power received by the first relay power reception antenna between a first first amplitude and a first second voltage, in which the i-th (i=2 to N) relay apparatus also includes an i-th relay amplitude modulator that transmits binary i-th relay transmission data to the (i−1)th relay apparatus through electromagnetic coupling between the i-th relay power reception antenna and the (i−1)th relay power transmission antenna by varying amplitude of voltage of the (i−1)th relay alternating current power received by the i-th relay power reception antenna between an i-th first amplitude and an i-th second amplitude, and in which the (i−1)th (i=2 to N) relay apparatus also includes an (i−1)th relay demodulator that is connected to the (i−1)th relay power transmission antenna and that receives binary (i−1)th relay received data by demodulating the binary i-th relay transmission data on the basis of a change in the voltage of the (i−1)th relay alternating current power input to the (i−1)th relay power transmission antenna, and an (i−1)th relay reverse control circuit that reverses a sign of the binary (i−1)th relay received data received by the (i−1)th relay demodulator and that performs, using the (i−1)th relay amplitude modulator, control for eliminating a difference between a first voltage of the (i−1)th relay direct current power, which corresponds to the i-th first amplitude, and a second voltage of the (i−1)th relay direct current power, which corresponds to the i-th second amplitude, on the basis of the reversed binary (i−1)th relay received data.

According to the above aspect, the (i−1)th (i=2 to N) relay apparatus includes an (i−1)th relay demodulator that is connected to the (i−1)th relay power transmission antenna and that receives binary (i−1)th relay received data by demodulating the binary i-th relay transmission data on the basis of a change in the voltage of the (i−1)th relay alternating current power input to the (i−1)th relay power transmission antenna, and an (i−1)th relay reverse control circuit that reverses a sign of the binary (i−1)th relay received data received by the (i−1)th relay demodulator and that performs, using the (i−1)th relay amplitude modulator, control for eliminating a difference between a first voltage of the (i−1)th relay direct current power, which corresponds to the i-th first amplitude, and a second voltage of the (i−1)th relay direct current power, which corresponds to the i-th second amplitude, on the basis of the reversed binary (i−1)th relay received data.

As a result, the difference between the first voltage and the second voltage of the relay direct current power when a certain relay apparatus is receiving data from an apparatus in a subsequent stage in the wireless power transmission system including the plurality of relay apparatuses can be almost perfectly eliminated. The unnecessary reception of data by an apparatus in a previous stage described with reference to FIG. 5, therefore, can be prevented.

More specific embodiments of the present disclosure will be described hereinafter. Unnecessarily detailed description, however, might be omitted. For example, detailed description of well-known matters and redundant description of substantially the same components might be omitted. This is in order to prevent the following description from becoming unnecessarily redundant and facilitate understanding by those skilled in the art. It is to be noted that the present inventors provide the accompanying drawings and the following description in order to help those skilled in the art fully understand the present disclosure and do not intend to limit the theme described in the claims. In the following description, the same or similar components are given the same reference numerals.

It is to be noted that expressions "power transmission . . . ", "relay . . . ", and "power reception . . . " will be used herein for terms relating to a power transmission apparatus, a relay apparatus, and a power reception apparatus, respectively, to facilitate understanding. The terms "power transmission", "relay", and "power reception" might be omitted for the sake of simplicity.

First Embodiment

Figure 6:
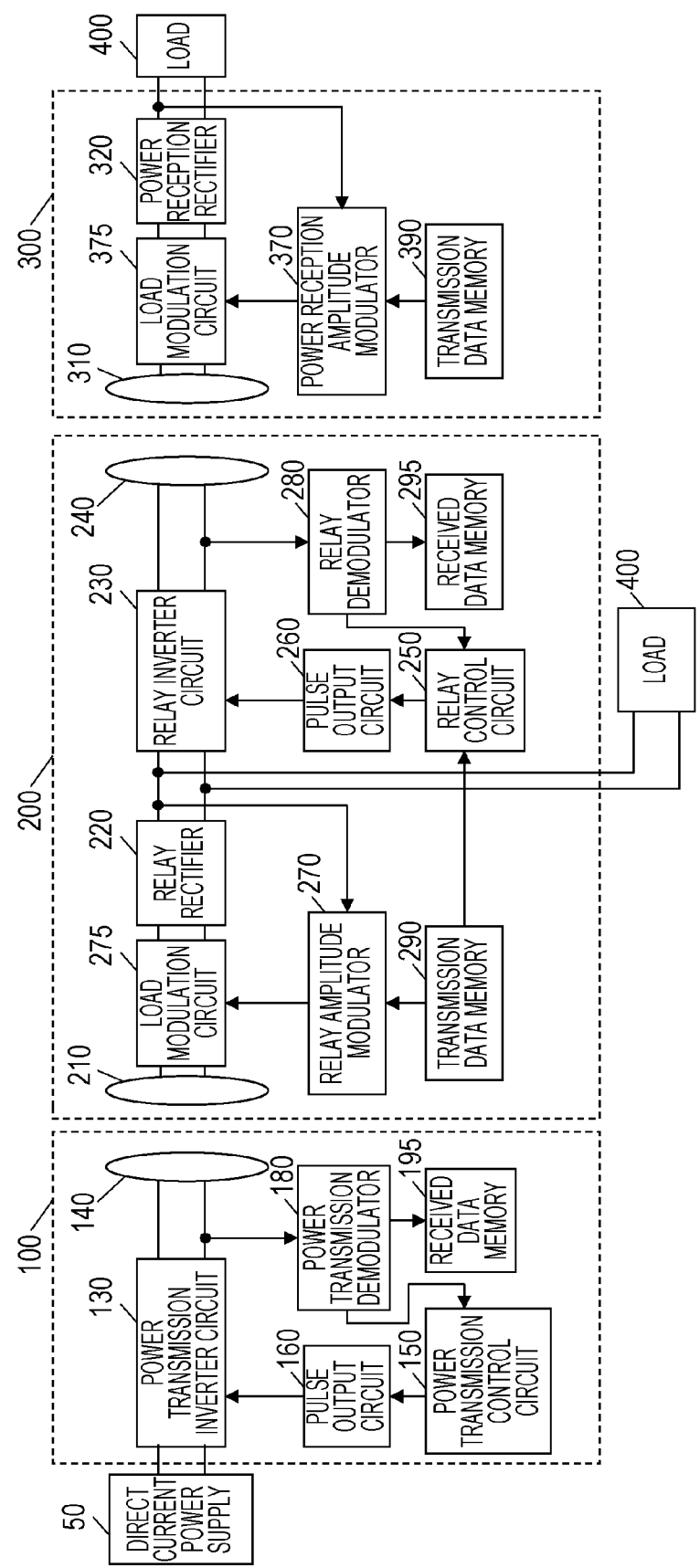
FIG. 6 is a block diagram illustrating the configuration of a wireless power transmission system according to a first embodiment.

FIG. 6 is a block diagram illustrating the configuration of a wireless power transmission system according to a first embodiment of the present disclosure. The wireless power transmission system includes a power transmission apparatus 100, a relay apparatus 200, and a power reception apparatus 300. The present system corresponds to the configuration illustrated in FIG. 2B and includes one relay apparatus 200.

The relay apparatus 200 according to the present embodiment has the same configuration as the relay apparatus 200 described with reference to FIG. 3, but the operation of a relay control circuit 250 is different from that described above. When a relay amplitude modulator 270 transmits data to the power transmission apparatus 100, the relay control circuit 250 according to the present embodiment controls a relay inverter circuit 230 such that the amplitude of the voltage of alternating current power output from the inverter circuit 230 does not vary. As a result, the relay apparatus 200 can correctly receive data from the power reception apparatus 300 even while the relay apparatus 200 is transmitting data.

The power transmission apparatus 100 includes a power transmission inverter circuit 130 that converts direct current power input from an external direct current (DC) power supply 50 into alternating current power and that outputs the alternating current power and a power transmission power transmission antenna 140 that transmits the alternating current power output from the power transmission inverter circuit 130. The power transmission apparatus 100 also includes a pulse output circuit 160 that drives the power transmission inverter circuit 130, a power transmission control circuit 150 that controls the pulse output circuit 160, a power transmission demodulator 180 that demodulates data transmitted from the relay apparatus 200, and a received data memory 195.

The relay apparatus 200 is electromagnetically coupled with the power transmission power transmission antenna 140 and includes a relay power reception antenna 210 that receives transmitted alternating current power (power transmission alternating current power), a relay rectifier 220 that converts the received power transmission alternating current power into direct current power (relay direct current power), the relay inverter circuit 230 that converts the relay direct current power into alternating current power (relay alternating current power), and a relay power transmission antenna 240 that wirelessly transmits the obtained relay alternating current power. The relay apparatus 200 also includes a load modulation circuit 275 connected between the power reception antenna 210 and the rectifier 220, the relay amplitude modulator 270 that changes a value of a load of the load modulation circuit 275 in accordance with values of transmission data, and a transmission data memory 290 storing the transmission data. The relay apparatus 200 also includes a pulse output circuit 260 that supplies pulse signals to a plurality of switching elements included in the relay inverter circuit 230, the relay control circuit 250 that controls the pulse output circuit 260, a relay demodulator 280 that receives data by detecting changes in the amplitude of an alternating current voltage applied to the power transmission antenna 240, and a received data memory 295 storing the received data.

The power reception apparatus 300 includes a power reception power reception antenna 310 that receives relay alternating current power transmitted from the relay power transmission antenna 240 and a power reception rectifier 320 that converts the alternating current power received by the power reception antenna 310 into direct current power (power reception direct current power) and that outputs the direct current power. The power reception apparatus 300 also includes a load modulation circuit 375 connected between the power reception antenna 310 and the rectifier 320, a power reception amplitude modulator 370 that controls the load modulation circuit 375 in such a way as to modulate the amplitude of the alternating current power received by the power reception antenna 310, and a transmission data memory 390 storing data to be transmitted to the relay apparatus 200.

Figure 7:
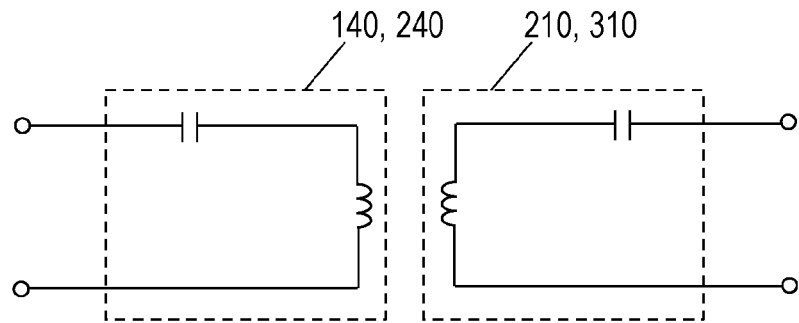
FIG. 7 is a diagram illustrating an example of an equivalent circuit of antennas having the configuration of series resonant circuits.

The power transmission power transmission antenna 140, the relay power reception antenna 210, the relay power transmission antenna 240, and the power reception power reception antenna 310 can each be achieved, for example, by a resonant circuit including a coil and a capacitor. FIG. 7 illustrates an example of an equivalent circuit of the antennas 140, 240, 210, and 310, which have the configuration of series resonant circuits. Alternatively, each antenna may have the configuration of a parallel resonant circuit. A coil in a power transmission antenna might be herein referred to as a power transmission coil, and a coil in a power reception antenna might be referred to as a power reception coil. With these antennas, power is wirelessly transmitted through inductive coupling (that is, magnetic field coupling) between the power transmission coil and the power reception coil. Each antenna may have a configuration for wirelessly transmitting power through electric field coupling instead of magnetic field coupling. In this case, each antenna can include two electrodes for transmitting or receiving power and a resonant circuit that includes an inductor and a capacitor. A power transmission antenna and a power reception antenna employing electric field coupling can be suitably used when power is wirelessly transmitted to a mobile device such as a carrier robot in a factory.

The power reception apparatus 300 can be, for example, a tip of a robot arm, a rotation unit of a monitoring camera, or the like. The power transmission apparatus 100 is an apparatus that wirelessly supplies power to the relay apparatus 200 and can be mounted, for example, on a root of the robot arm or a fixing unit of the monitoring camera. The relay apparatus 200 can be, for example, a component connecting the root and the tip of the robot arm or a component connecting the fixing unit and the rotation unit of the monitoring camera. A load 400 can be, for example, a device including a motor, such as an actuator, mounted on the tip of the robot arm or an image capture device, such as a charge-coupled device (CCD) camera, mounted on the rotation unit of the monitoring camera. The load 400 is connected to the relay rectifier 220 and the power reception rectifier 320 and driven by direct current power.

With this configuration, the wireless power transmission system according to the present embodiment can communicate data between adjacent apparatuses while wirelessly transmitting power. A type of data to be transmitted can be, for example, information indicating a power value or a voltage in a circuit, a control signal or a signal indicating an abnormality from a connected load, or the like. The transmission data may be a response signal to an instruction or image (video) data.

Figure 8A:
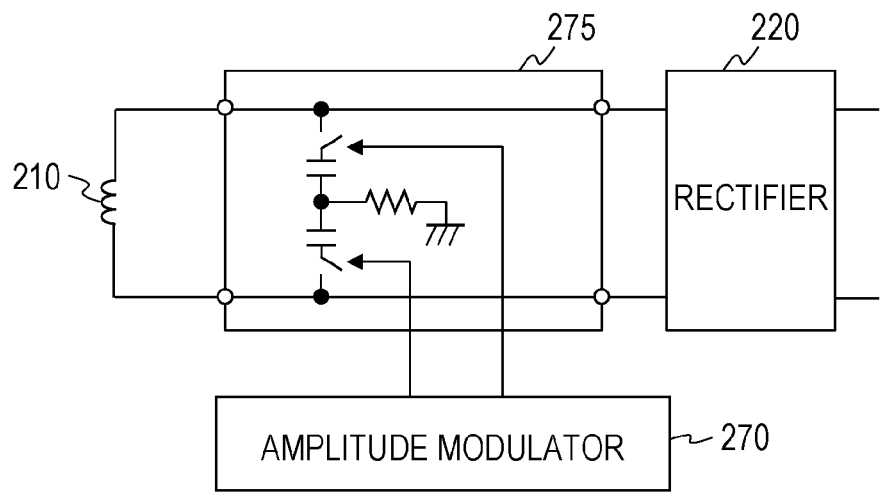
FIG. 8A is a diagram illustrating an example of the configuration of a load modulation circuit.

FIG. 8A is a diagram illustrating an example of the configuration of the load modulation circuit 275. The illustrated load modulation circuit 275 is connected between the power reception antenna 210 and the rectifier 220. The load modulation circuit 275 includes two switches and two capacitors connected parallel to the power reception antenna 210 and a resistor connected between a point between the two capacitors and the ground. The load modulation circuit 275 performs load modulation by switching open/close states of the two switches on the basis of controls signals from the amplitude modulator 270. More specifically, the load modulation circuit 275 changes a value of an overall load thereof by switching on/off states of the two switches and opening or closing a current route different from a route to the load 400. As a result, information can be transmitted to the power transmission apparatus 100.

Figure 8B:
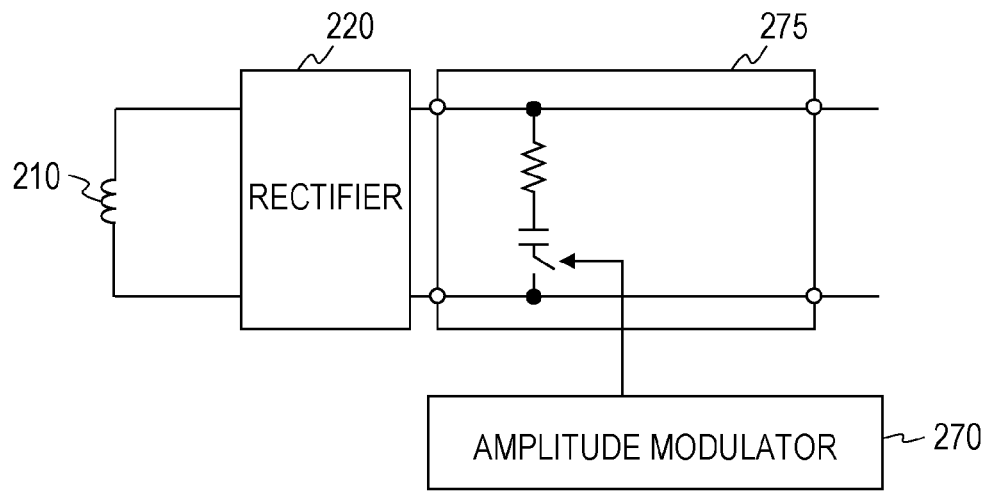
FIG. 8B is a diagram illustrating another example of the configuration of the load modulation circuit.

Although the load modulation circuit 275 is arranged in a previous stage of the rectifier 220 in the example illustrated in FIG. 6, the load modulation circuit 275 may be arranged in a subsequent stage of the rectifier 220, instead. FIG. 8B is a diagram illustrating an example of the load modulation circuit 275 arranged in this manner. The load modulation circuit 275 is connected between the rectifier 220 and the load 400. The load modulation circuit 275 includes a resistor and a switch connected parallel to the rectifier 220. The load modulation circuit 275 can change an overall load of the power reception apparatus by switching an on/off state of the switch on the basis of a control signal from the amplitude modulator 270.

Although FIGS. 8A and 8B illustrate an example the configuration of the relay amplitude modulator 270 and the relay load modulation circuit 275, the power reception amplitude modulator 370 and the power reception load modulation circuit 375 have the same configuration.

The power transmission inverter circuit 130 and the relay inverter circuit 230 convert supplied direct current power into alternating current power using a plurality of switching elements. In order to control the inverter circuits 130 and 230, the pulse output circuits 160 and 260 and the control circuits 150 and 160, respectively, are used. The power transmission control circuit 150 and the relay control circuit 250 are each achieved, for example, by an integrated circuit including a processor such as a microcontroller (MCU). The pulse output circuits 160 and 260 are each achieved, for example, by a known gate driver. The control circuits 150 and 250 may be integrated with other circuit elements.

The power transmission control circuit 150 and the relay control circuit 250 control pulse signals input to the switching elements from the pulse output circuits 160 and 260 by adjusting a power transmission parameter on the basis of the content of data received by the power transmission demodulator 180 and the relay demodulator 280, respectively. As a result, the frequency and amplitude of the alternating current power output from the inverter circuits 130 and 230 are adjusted to appropriate values.

The power transmission parameter is a parameter for controlling timings at which the plurality of switching elements included in each inverter circuit are turned on (conductive state) and off (nonconductive state). The power transmission parameter can be the frequency of a pulse signal input to each switching element, a phase difference (also referred to as the "amount of phase shift") between two pulse signals input to two switching elements that are simultaneously turned on among the plurality of switching elements, a duty ratio of the pulse signal input to each switching element, or the like.

Figure 9A:
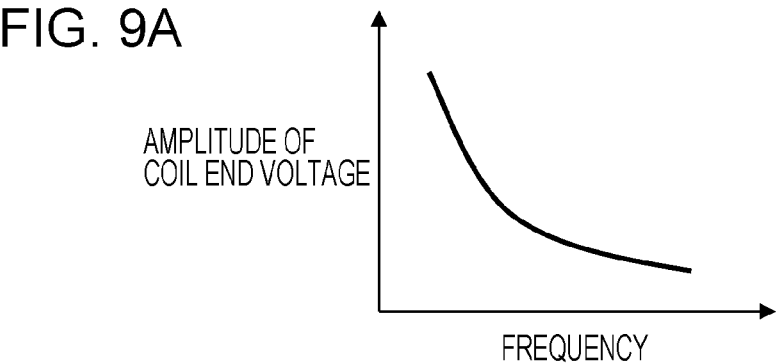
FIG. 9A schematically illustrates the dependence of the amplitude of a voltage at both ends of a coil of a relay power transmission antenna upon frequency.
Figure 9B:
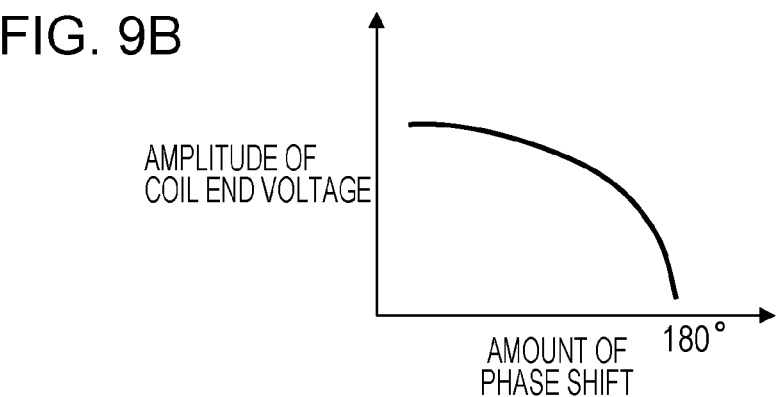
FIG. 9B schematically illustrates the dependence of the amplitude of the voltage at both ends of the coil of the relay power transmission antenna upon the amount of phase shift.
Figure 9C:
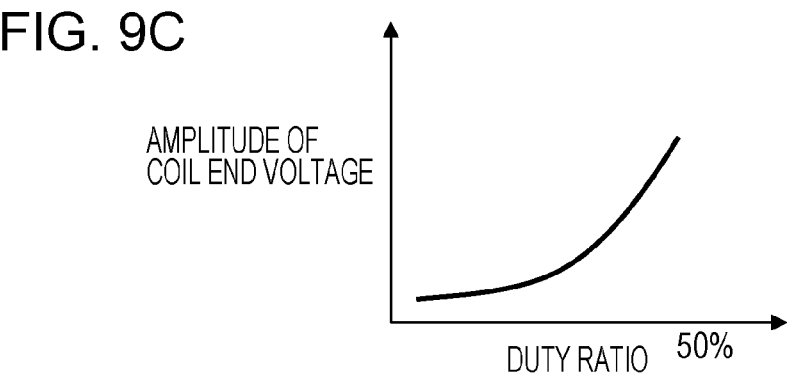
FIG. 9C schematically illustrates the dependence of the amplitude of the voltage at both ends of the coil of the relay power transmission antenna upon a duty ratio.
Figure 9D:
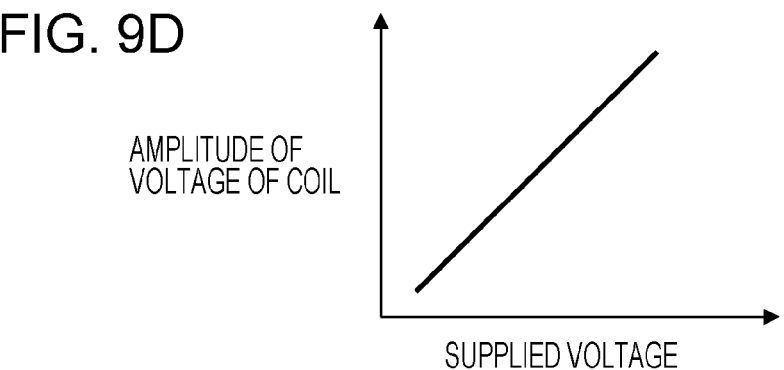
FIG. 9D schematically illustrates the dependence of the amplitude of the voltage at both ends of the coil of the relay power transmission antenna upon a voltage supplied to a relay inverter circuit.

FIGS. 9A to 9D schematically illustrate the dependence of the amplitude of a voltage (also referred to as a coil end voltage) at both ends of the coil included in the relay power transmission antenna 240 upon the frequency, the amount of phase shift, the duty ratio, and a voltage supplied to the relay inverter circuit 230, respectively. As illustrated in FIG. 9A, when the frequency is increased, the amplitude of the coil end voltage tends to decrease. As illustrated in FIG. 9B, when the amount of phase shift is increased within a range of 0° to 180°, the amplitude of the coil end voltage decreases. As illustrated in FIG. 9C, when the duty ratio is increased within a range of 0% to 50%, the amplitude of the coil end voltage increases. As illustrated in FIG. 9D, when the voltage supplied to the relay inverter circuit 230 is increased, the amplitude of the coil end voltage increases. The relay control circuit 250, therefore, can control the amplitude of the coil end voltage using at least any of the frequency, the amount of phase shift, the duty ratio, and the supplied voltage as a control parameter. It is to be noted that the voltage supplied to the inverter circuit 230 can be controlled when a DC-DC converter is provided between the relay rectifier 220 and the relay inverter circuit 230. With this configuration, the relay control circuit 250 can adjust a value of a voltage output from the DC-DC converter by changing the frequency of switching of switching elements included in the DC-DC converter.

Figure 10:
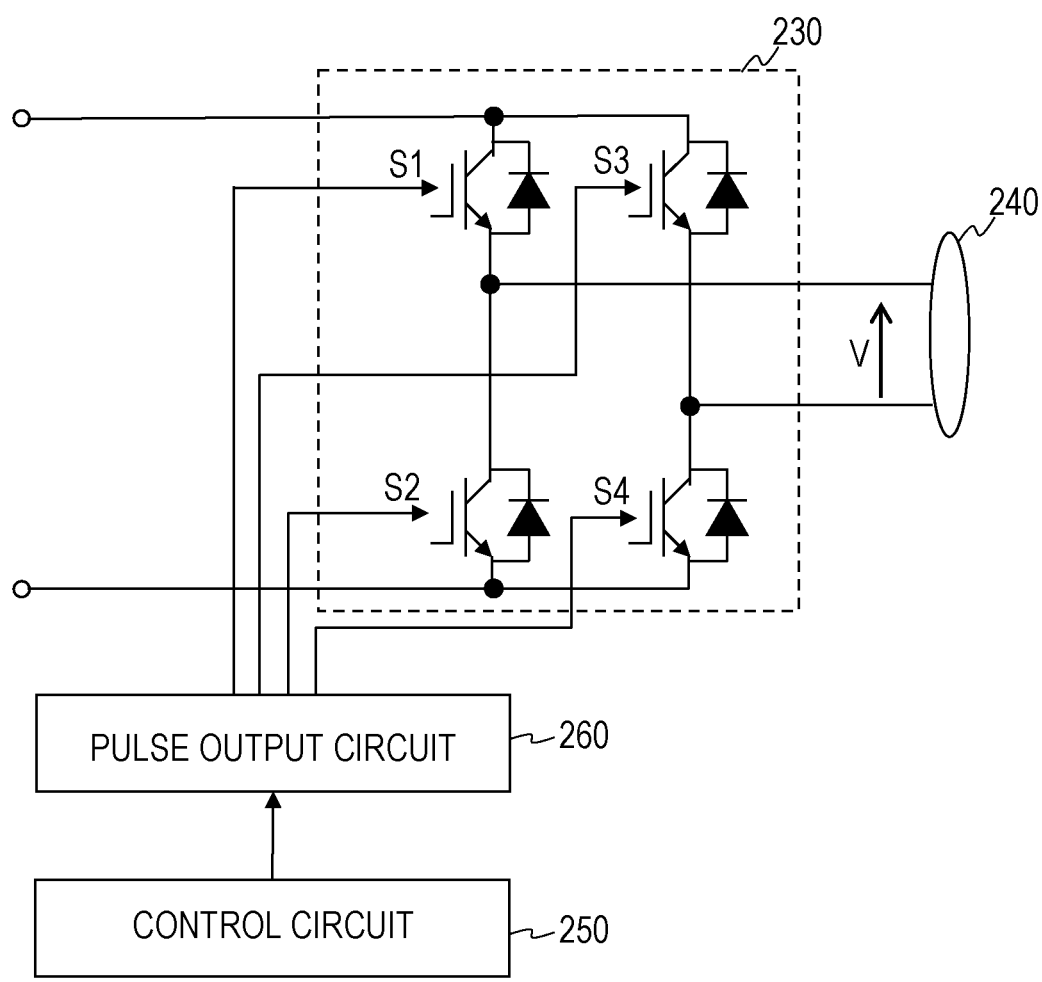
FIG. 10 is a diagram illustrating an example of the configuration of the relay inverter circuit.

FIG. 10 is a diagram illustrating an example of the relay inverter circuit 230. The inverter circuit 230 includes a plurality of switching elements S1 to S4 whose conductive/nonconductive states change in accordance with pulse signals supplied from the pulse output circuit 260. By changing the conductive/nonconductive state of each switching element, input direct current power can be converted into alternating current power. In the example illustrated in FIG. 10, a full-bridge inverter circuit including the four switching elements S1 to S4 is used. In this example, each switching element is an insulated-gate bipolar transistor (IGBT), but a switching element of another type, such as a metal-oxide-semiconductor field-effect transistor (MOSFET) may be used, instead.

In the example illustrated in FIG. 10, among the four switching elements S1 to S4, the switching elements S1 and S4 (first switching element pair) output, when conductive, a voltage having the same polarity as a supplied direct current voltage. On the other hand, the switching elements S2 and S3 (second switching element pair) output, when conductive, a voltage having an opposite polarity to the supplied direct current voltage. The pulse output circuit 260 supplies pulse signals to gates of the switching elements S1 to S4 in accordance with an instruction from the control circuit 250. At this time, the pulse output circuit 260 can perform amplitude control by adjusting a phase difference between the two pulse signals supplied to the first switching element pair (S1 and S4) and a phase difference between the two pulse signals supplied to the second switching element pair (S2 and S3).

Figure 11A:
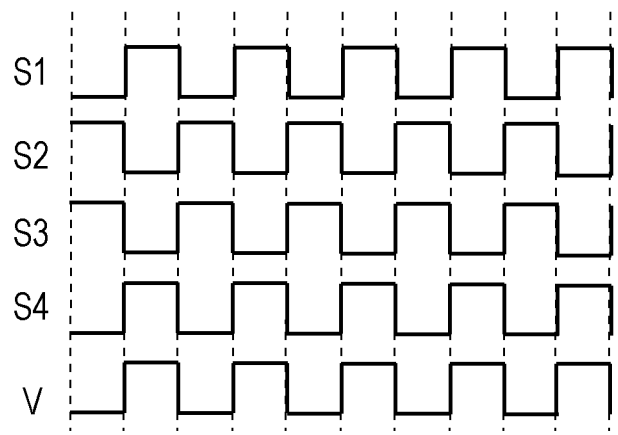
FIG. 11A is a diagram illustrating amplitude control based on a phase difference between pulse signals.
Figure 11B:
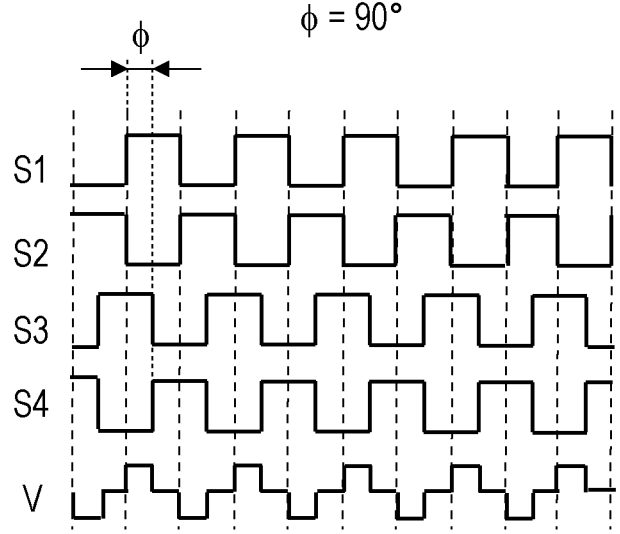
FIG. 11B is a diagram illustrating the amplitude control based on the phase difference between the pulse signals.

FIGS. 11A and 11B are diagrams illustrating the amplitude control based on the phase differences between the pulse signals. FIG. 11A schematically illustrates temporal changes in the four pulse signals and a voltage V output from the inverter circuit 230 at a time when an amount $\varphi$ of phase shift between the two pulse signals supplied to the switching elements S1 and S4 and the amount $\varphi$ of phase shift between the two pulse signals supplied to the switching elements S2 and S3 are 0 degree. FIG. 11B schematically illustrates temporal changes in the pulse signals and the voltage V at a time when the amount $\varphi$ of phase shift is 90 degrees. The amount $\varphi$ of phase shift is adjusted by temporally shifting rising and falling timings of the pulse signals input to the switching elements S3 and S4 relative to rising and falling timings of the pulse signals input to the switching elements S1 and S2. If the amount $\varphi$ of phase shift is changed, an output time ratio (a ratio of a period in which the voltage V is not zero to one cycle) changes. The output time ratio of the voltage V becomes higher as the amount $\varphi$ of phase shift becomes closer to 0 degree, and becomes lower as the amount $\varphi$ of phase shift becomes closer to 180 degrees. The voltage V output from the inverter circuit 230 can be converted into a sine-wave voltage by a smoothing circuit that is not illustrated and supplied to the power transmission antenna 240. The amplitude of the sine-wave voltage changes in accordance with the output time ratio. By changing the amount $\varphi$ of phase shift, therefore, the amplitude of the alternating current voltage input to the power transmission antenna 240 can be changed.

Figure 12:
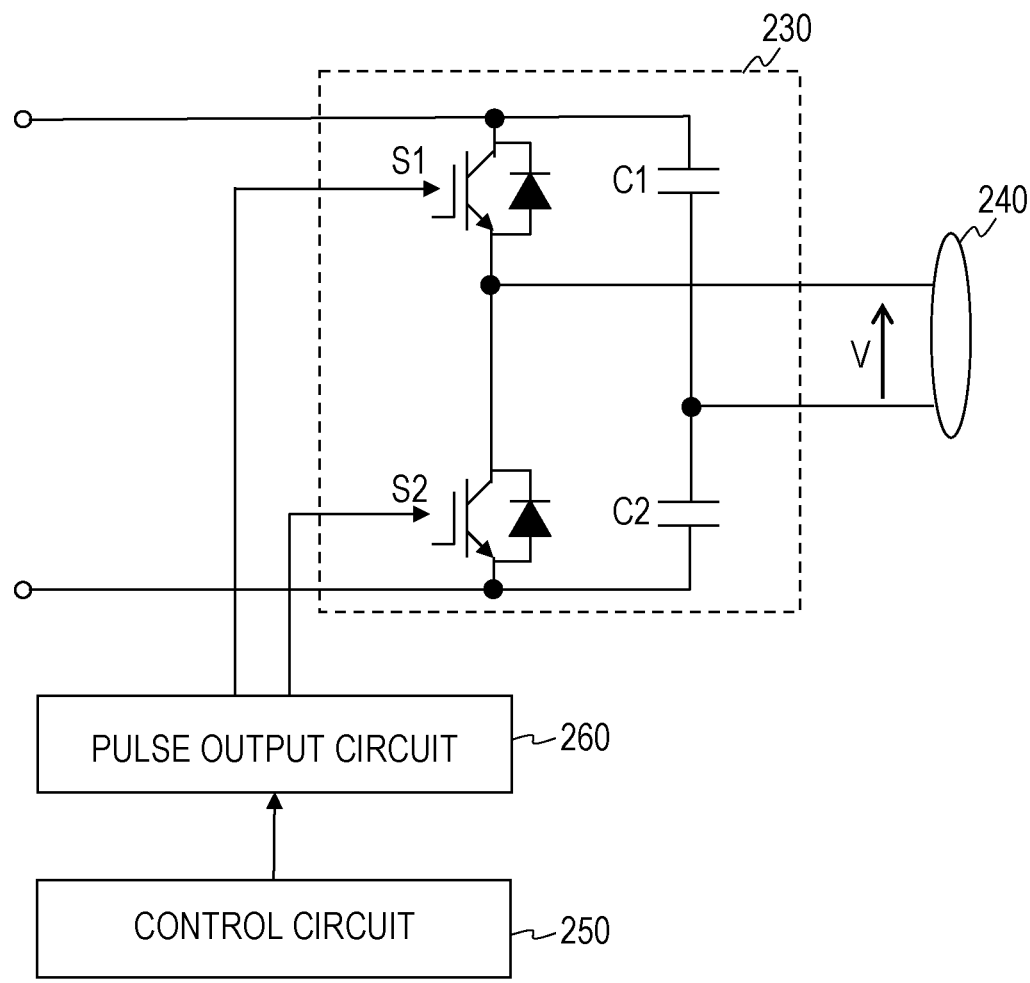
FIG. 12 is a diagram illustrating another example of the configuration of the relay inverter circuit.

FIG. 12 is a diagram illustrating another example of the configuration of the relay inverter circuit 230. The inverter circuit 230 in this example is a half-bridge inverter circuit. When a half-bridge inverter circuit is used, the above-described phase control is not applied. In this case, the amplitude of the voltage can be controlled by controlling the duty ratio of the pulse signal input to each switching element. The half-bridge inverter circuit illustrated in FIG. 12, which will be described later, is a circuit that controls the duty ratio. In contrast to FIG. 12, the full-bridge inverter circuit illustrated in FIG. 10 is a circuit that controls the amount $\varphi$ of phase shift. Compared to a half-bridge inverter circuit, a full-bridge inverter circuit can reduce generation of noise in alternating current power input to the power transmission antenna 240.

The inverter circuit 230 illustrated in FIG. 12 is a half-bridge inverter circuit including two switching elements S1 and S2 and two capacitors. The two switching elements S1 and S2 and two capacitors C1 and C2 are connected parallel to each other. One end of the power transmission antenna 240 is connected to a point between the two switching elements S1 and S2, and another end is connected to a point between the two capacitors C1 and C2.

The control circuit 250 and the pulse output circuit 260 supply a pulse signal to each switching element such that the switching elements S1 and S2 alternately turn on. As a result, direct current power is converted into alternating current power.

In this example, the output time ratio of the output voltage V can be adjusted by adjusting the duty ratio (that is, a ratio of a period in which the pulse signal is on to one cycle) of the pulse signals. As a result, the amplitude of the voltage of the alternating current power input to the power transmission antenna 240 can be adjusted.

Figure 13A:
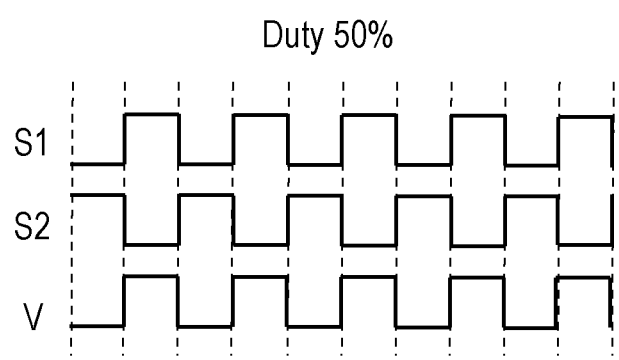
FIG. 13A is a diagram illustrating duty control.
Figure 13B:
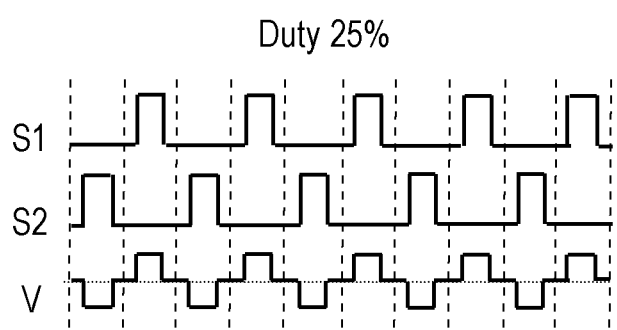
FIG. 13B is a diagram illustrating the duty control.

FIGS. 13A and 13B are diagrams illustrating the duty control. FIG. 13A illustrates an example of waveforms of the pulse signals input to the switching elements S1 and S2 and the output voltage V at a time when the duty ratio of each pulse signal is 0.5 (50%). FIG. 13B illustrates an example of waveforms of the pulse signals input to the switching elements S1 and S2 and the output voltage V at a time when the duty ratio of each pulse signal is 0.25 (25%). As illustrated in the figures, by changing the duty ratio, the output time ratio (that is, a period in which the voltage V is not zero to one cycle) of the voltage V can be changed. As a result, the amplitude of the smoothed voltage of transmission power, too, can be changed. Such pulse signals whose duty ratios are different from each other are generated, for example, by the pulse output circuit 260 including a pulse-width modulation (PWM) control circuit. The duty ratio is adjusted within a range of 0% to 50%. When the duty ratio is 50%, the amplitude of the voltage of transmission power becomes largest, and when the duty ratio is 0%, the amplitude of the voltage of transmission power becomes smallest. The duty control can also be applied when the full-bridge inverter circuit illustrated in FIG. 10 is used.

It is to be noted that although a method for controlling the relay inverter circuit 230 has been described in the above example, the same type of control can also be applied to the power transmission inverter circuit 130.

Next, the control according to the present embodiment will be described more specifically.

The relay control circuit 250 according to the present embodiment performs control for suppressing variation in the amplitude of the voltage output from the relay inverter circuit 230 caused when the relay amplitude modulator 270 modulates the amplitude to transmit data. More specifically, the relay control circuit 250 changes a value of a control parameter used in synchronization with timings at which the relay amplitude modulator 270 changes the amplitude of the voltage between two values (a first amplitude V1 and a second amplitude V2). The value of the control parameter is determined such that a difference between the amplitude (third amplitude V3) of relay alternating current power corresponding to the first amplitude V1 and the amplitude (fourth amplitude V4) of relay alternating current power corresponding to the second amplitude V2 becomes close to 0. Such a control parameter can be determined, for example, on the basis of a voltage detected by the relay demodulator 280.

Figure 14:
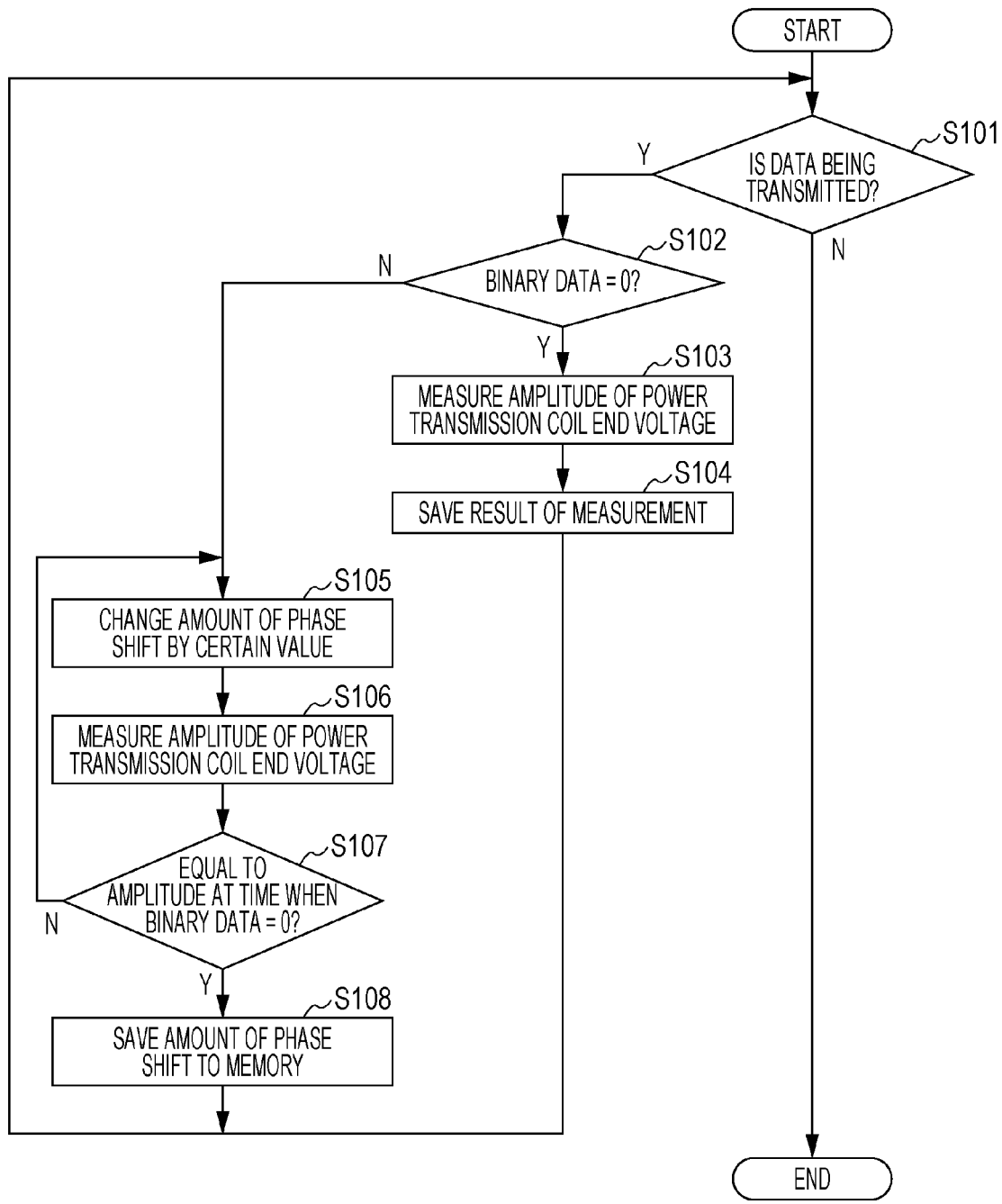
FIG. 14 is a flowchart illustrating an example of operations performed when the relay apparatus transmits binary data to a power transmission apparatus.

FIG. 14 is a flowchart illustrating an example of operations performed when the relay apparatus 200 transmits binary data to the power transmission apparatus 100. The control parameter is the amount of phase shift in this example, but the following operations also apply when another control parameter is used.

First, the relay control circuit 250 determines whether data is being transmitted (step S101). If data is being transmitted, the relay control circuit 250 determines whether the transmission data is 0 (step S102). If the transmission data is 0, the relay control circuit 250 measures the amplitude of the power transmission coil end voltage (step S103) and saves a result of the measurement to the memory (step S104). The measurement and the saving may be performed by the demodulator 280, instead. The relay control circuit 250 then returns to step S101 and performs the same process on next data.

In step S102, if the transmission data is not 0 but 1, the relay control circuit 250 changes the amount of phase shift by a certain value (step S105) and measures the amplitude of the power transmission coil end voltage (step S106). The relay control circuit 250 then determines whether the measured amplitude of the power transmission coil voltage is equal to one at a time when the transmission data is 0 (step S107). If the two amplitudes are not the same, the relay control circuit 250 changes the amount of phase shift in steps of the certain value until the amplitudes become the same. If the two amplitudes are the same, the relay control circuit 250 saves information indicating the amount of phase shift at this time to the memory. The relay control circuit 250 then returns to step S101 and performs the same process on next data.

As described above, by saving the control parameter to the memory, the amount of phase shift can enter, using the value saved in the memory, a state in which the amplitude immediately becomes constant when next and later data is transmitted.

Figure 15A:
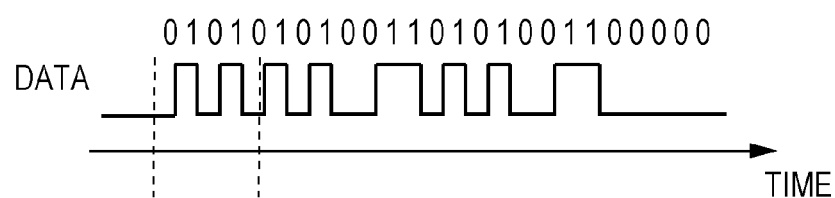
FIG. 15A is a diagram illustrating an example of data (e.g., a packet signal) to be transmitted.
Figure 15B:
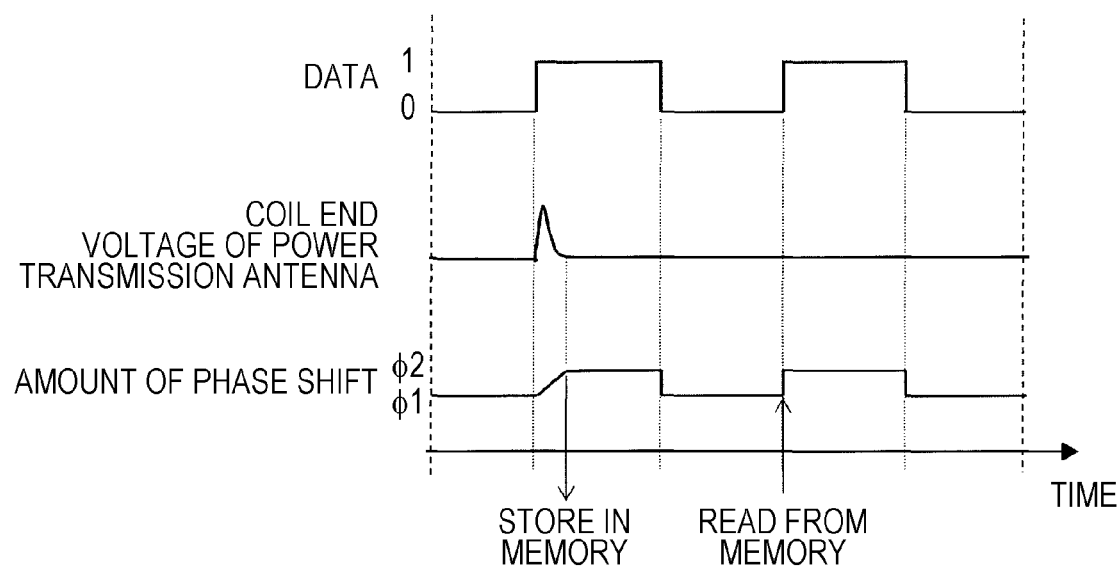
FIG. 15B is a diagram illustrating temporal changes in transmission data, the amplitude of a coil end voltage of a power transmission antenna, and the amount of phase shift in a period defined by two broken lines illustrated in FIG. 15A.

FIG. 15A is a diagram illustrating an example of data (e.g., a packet signal) to be transmitted. FIG. 15B is a diagram illustrating temporal changes in the transmission data, the amplitude of the coil end voltage of the power transmission antenna, and the amount of phase shift in a period defined by two broken lines illustrated in FIG. 15A. When the transmission data changes from 0 to 1, the amplitude of the voltage changes. The control circuit 250 adjusts the amount of phase shift through the operations illustrated in FIG. 14 so that the change becomes smaller. As a result, the amplitude when the transmission data is 1 becomes the same as the amplitude when the transmission data is 0. The amount of phase shift at this time is saved to the memory, and the amount of phase shift can be changed next time and later by referring to the value stored in the memory. As a result of these operations, time taken to complete control for making the amplitude of the voltage constant can be reduced.

Figure 16:
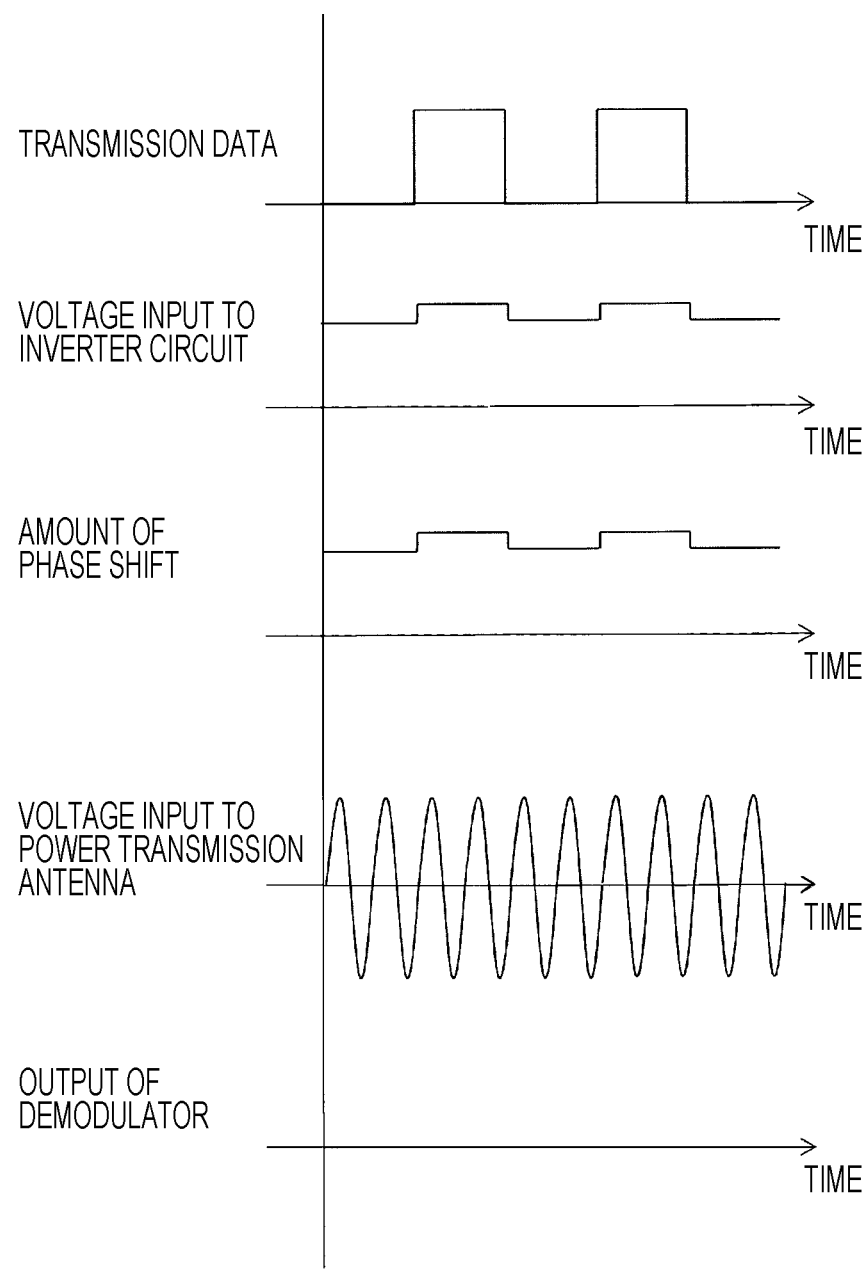
FIG. 16 is a diagram illustrating an example of temporal changes in various waveforms according to the first embodiment.

FIG. 16 is a diagram illustrating an example of temporal changes in various waveforms according to the present embodiment. FIG. 16 illustrates an example of temporal changes in binary transmission data transmitted to a previous stage from the relay apparatus 200, the voltage input to the inverter circuit 230, the amount of phase shift, the voltage input to the power transmission antenna 240, and received data output from the relay demodulator 280. Here, only the relay apparatus 200 in question is transmitting data to an apparatus in the previous stage, and an apparatus in a subsequent stage is not transmitting data to the relay apparatus 200 in question or the relay apparatus 200 in question is not transmitting data to the apparatus in the subsequent stage. When a value of the transmission data is 1, the amplitude of the voltage of alternating current power input to the rectifier 220 becomes larger than when the value of the transmission data is 0. A value of the direct current voltage input to the inverter circuit 230 from the rectifier 220, therefore, is larger when the value of the transmission data is 1 than when the value of the transmission data is 0. The relay control circuit 250 according to the present embodiment, therefore, eliminates a change in the amplitude of the alternating current voltage input to the power transmission antenna 240 from the inverter circuit 230 by changing the amount of phase shift in synchronization with the change in the transmission data. As a result, it is possible to prevent the demodulator 280 from incorrectly receiving data. With the control according to the present embodiment, therefore, the problem of interference described with reference to FIG. 4 can be solved.

It is to be noted that although the number of relay apparatuses 200 is one in the present embodiment, a plurality of relay apparatuses 200 may be provided between the power transmission apparatus 100 and the power reception apparatus 300, instead.

Figure 17:
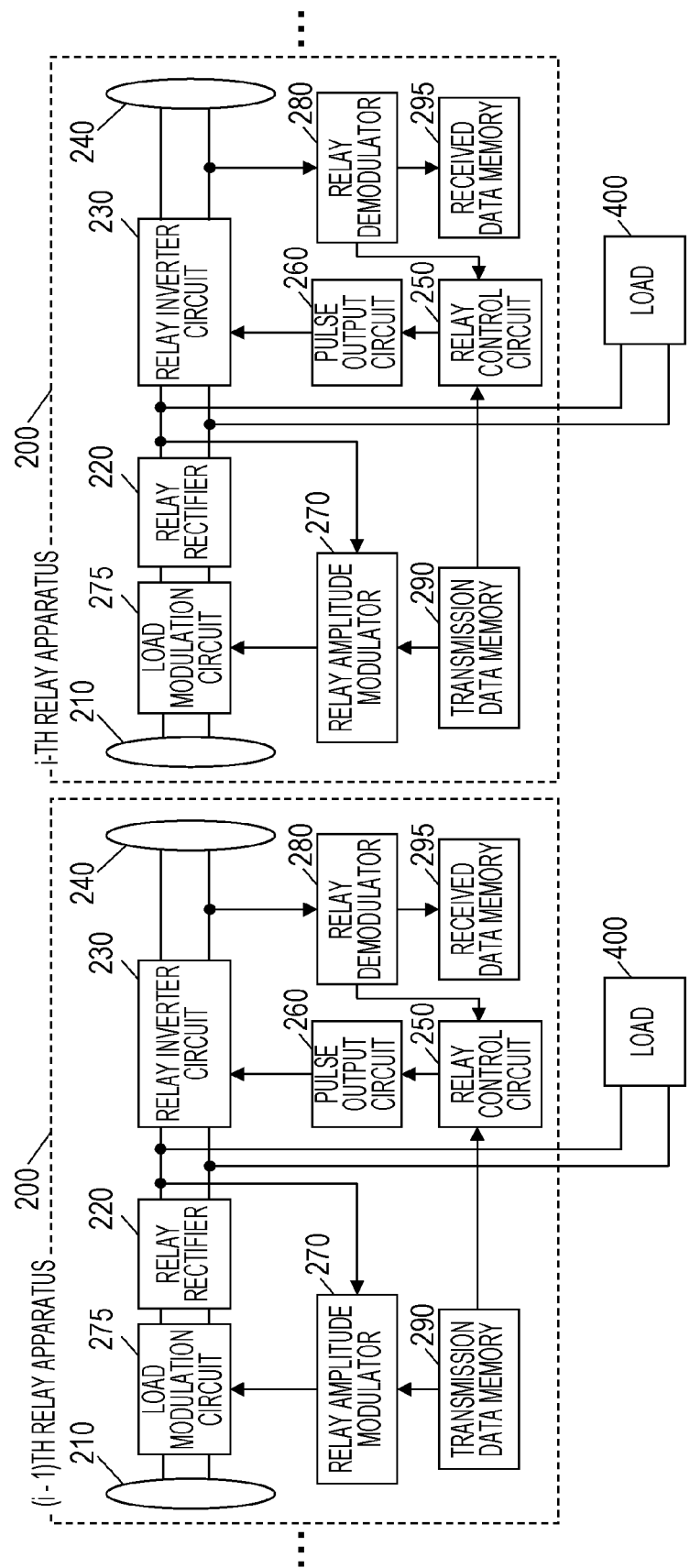
FIG. 17 is a diagram illustrating a modification of the first embodiment.

FIG. 17 is a diagram illustrating an example of a wireless power transmission system including a plurality of relay apparatuses 200. In FIG. 17, an (i−1)th (i=2 to N) relay apparatus and an i-th relay apparatus among N (N is an integer equal to or larger than 2) are illustrated. Each relay apparatus 200 have the same configuration as the relay apparatus 200 illustrated in FIG. 3. In addition, the power transmission apparatus 100 and the power reception apparatus 300 that are not illustrated in FIG. 17 have the same configurations as those illustrated in FIG. 3.

The relay control circuit 250 of each relay apparatus 200 performs, as described above, control for eliminating variation in the amplitude of the voltage when data is transmitted. As a result, it becomes possible to avoid propagation, to another relay apparatus or the power reception apparatus 300, of an effect of transmission of data from a certain relay apparatus 200.

Second Embodiment

Figure 18:
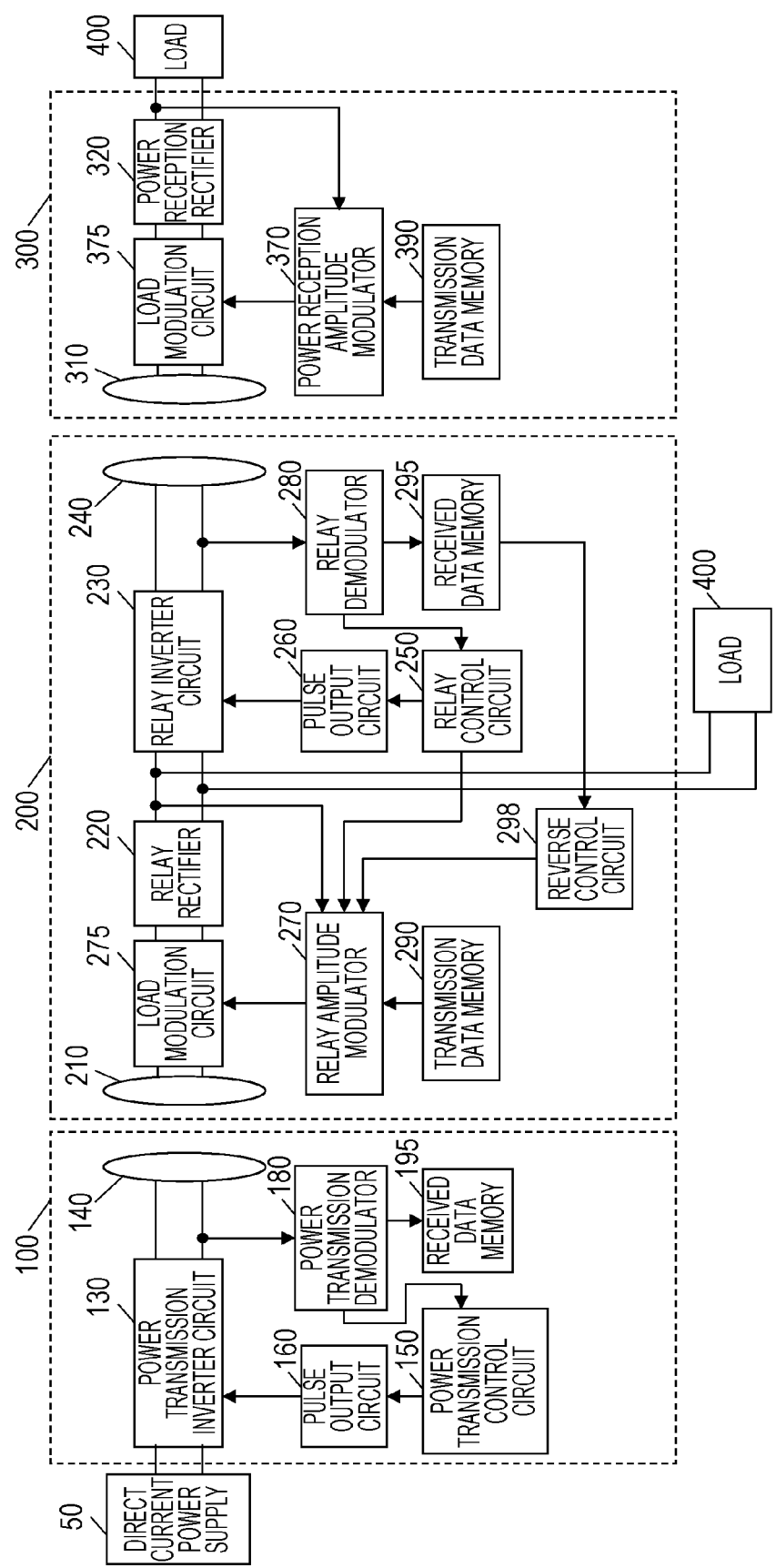
FIG. 18 is a diagram illustrating the configuration of a wireless power transmission system according to a second embodiment.

FIG. 18 is a diagram illustrating the configuration of a wireless power transmission system according to a second embodiment. The wireless power transmission system according to the present embodiment includes, as with the configuration illustrated in FIG. 3, the power transmission apparatus 100, the relay apparatus 200, and the power reception apparatus 300. The present embodiment is different from the first embodiment in that the relay apparatus 200 includes a reverse control circuit 298 that controls the relay amplitude modulator 270 on the basis of received data. By providing the reverse control circuit 298, the problem at a time of data reception described with reference to FIG. 5 can be solved.

In the present embodiment, the power reception amplitude modulator 370 varies the amplitude of the voltage of alternating current power (power reception alternating current power) received by the power reception power reception antenna 310 between the first amplitude (V1) and the second amplitude (V2). As a result, binary transmission data (power reception transmission data) is transmitted to the relay apparatus 200 through electromagnetic coupling between the power reception power reception antenna 310 and the relay power transmission antenna 240. The relay demodulator 280 demodulates the binary power reception transmission data on the basis of changes in the voltage of relay alternating current power input to the relay power transmission antenna 240. Here, the received data is data generated by demodulating the transmission data and saved to the received data memory 295.

The relay reverse control circuit 298 reverses a sign of the binary relay received data received by the relay demodulator 280 and causes the relay amplitude modulator 270 to modulate the amplitude of the voltage on the basis of the reversed binary relay received data. More specifically, the relay amplitude modulator 270 performs control for eliminating a difference between a first voltage (DC1) of relay direct current power, which corresponds to the first amplitude (V1), and a second voltage (DC2) of the relay direct current power, which corresponds to the second amplitude (V2). As a result, the variation in the voltage caused by the reception of data from the power reception apparatus 300 is eliminated.

Figure 19:
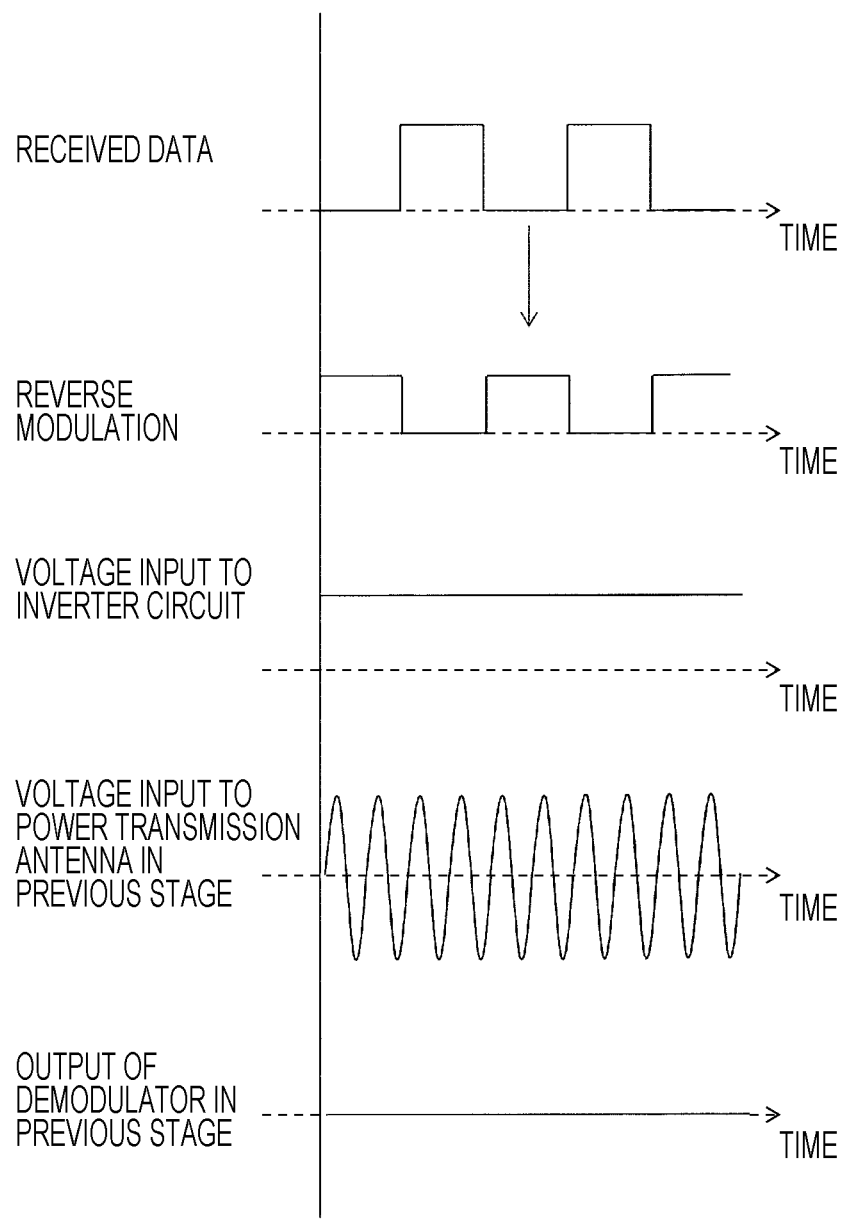
FIG. 19 is a diagram schematically illustrating an operation according to the second embodiment.

FIG. 19 is a diagram schematically illustrating the above-described operation according to the present embodiment. FIG. 19 illustrates an example of temporal changes in received data transmitted from the power reception apparatus 300 to the relay apparatus 200, a reverse modulation signal transmitted from the reverse control circuit 298 to the amplitude modulator 270, the voltage input to the inverter circuit 230 of the relay apparatus 200, a voltage input to the power transmission antenna 140 of the power transmission apparatus 100, and received data output from the demodulator 180 of the power transmission apparatus 100. Here, the relay apparatus 200 is only receiving data and is not transmitting data. When the received data is 1, voltage in circuits of the relay apparatus 200 and the power transmission apparatus 100 becomes higher than when the received data is 0. The reverse control circuit 298, therefore, transmits a reverse modulation signal, which is obtained by reversing the received data, to the relay amplitude modulator 270. Upon receiving the reverse modulation signal, the relay amplitude modulator 270 controls the load modulation circuit 275. As a result, variation in the direct current voltage input to the relay inverter circuit 230 is eliminated. Consequently, variation in the amplitude of the alternating current voltage input to the power transmission antenna 140 of the power transmission apparatus 100 is also eliminated. It is therefore possible to avoid reception, by the power transmission demodulator 180, of the same data as relay received data.

The control performed by the amplitude modulator 270 and the load modulation circuit 275 will be described more specifically hereinafter.

Figure 20A:
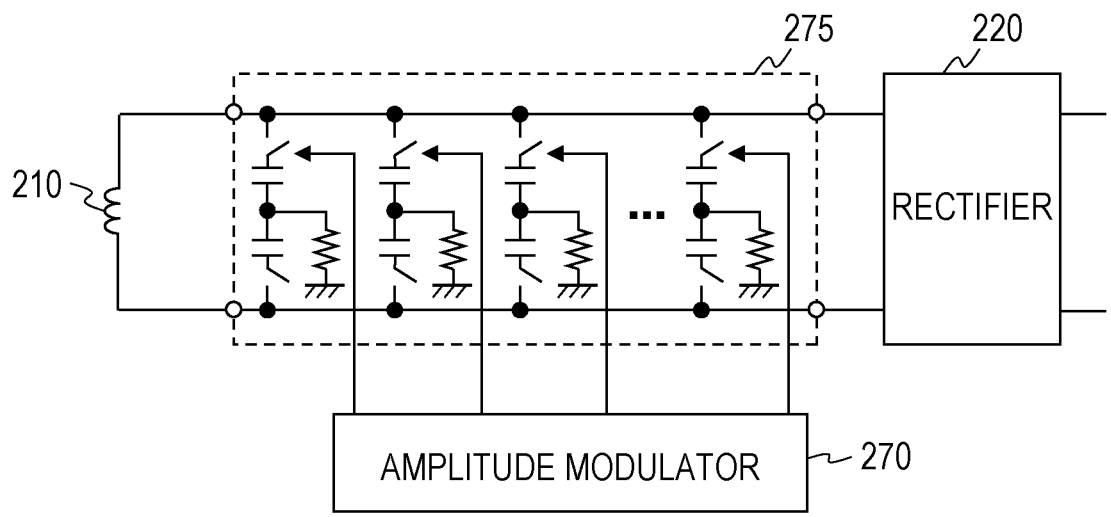
FIG. 20A is a diagram illustrating an example of the configuration of a load modulation circuit according to the second embodiment.

FIG. 20A is a diagram illustrating an example of the configuration of the load modulation circuit 275 according to the present embodiment. The load modulation circuit 275 is connected between the relay power reception antenna 210 and the relay rectifier 220 and includes a plurality of capacitors and a plurality of switches. The amplitude modulator 270 determines, on the basis of a reverse modulation signal, a combination of switches for achieving an appropriate load modulation level in order to eliminate the amplitude. The reverse modulation signal is a control signal specifying turning on or off of the switches.

Figure 20B:
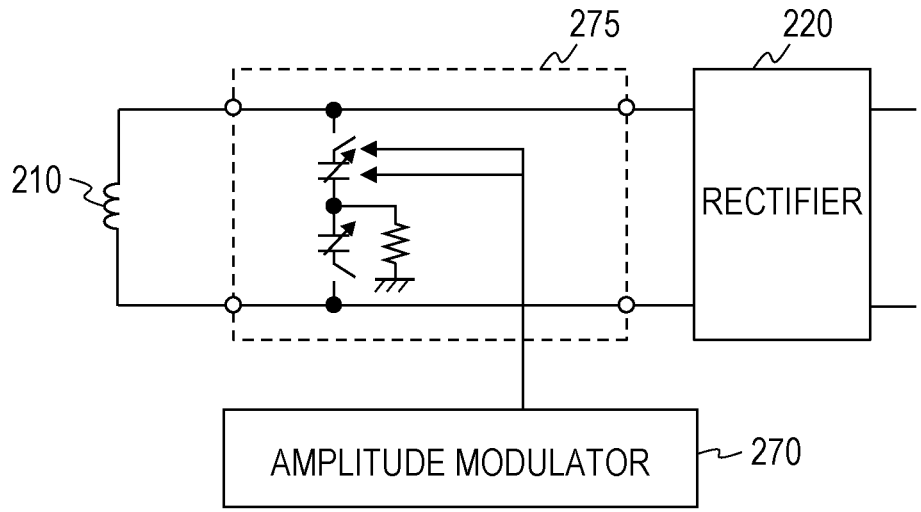
FIG. 20B is a diagram illustrating another example of the configuration of the load modulation circuit.

FIG. 20B is a diagram illustrating another example of the configuration of the load modulation circuit 275. The load modulation circuit 275 can adjust the load modulation level using variable capacitors. The amplitude modulator 270 adjusts, on the basis of a reverse modulation signal, capacitances of the variable capacitors to appropriate values in order to eliminate the load. In this example, the reverse modulation signal is a signal specifying the capacitances of the variable capacitors and the switch(es) to be turned on.

Figure 21:
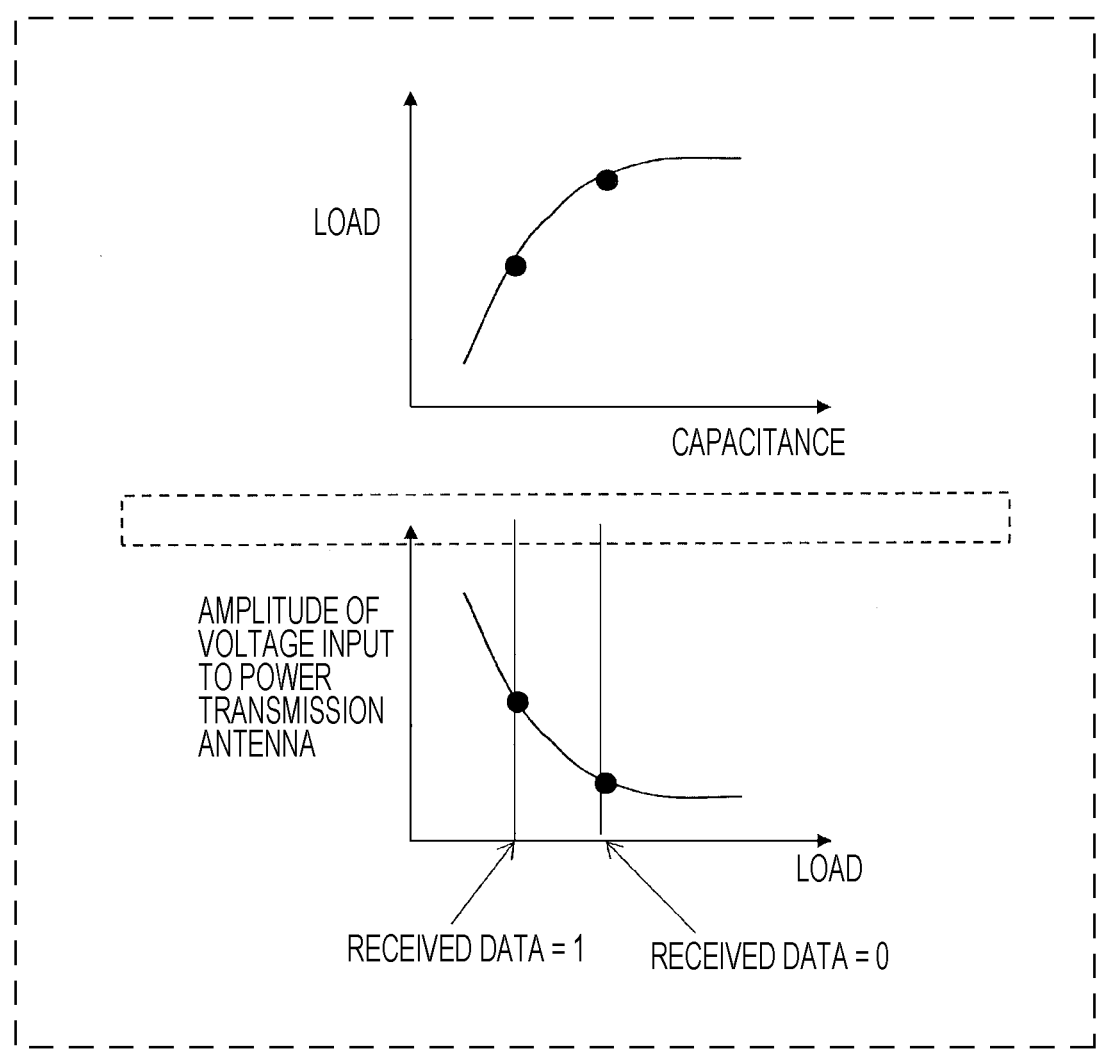
FIG. 21 is a diagram indicating a graph schematically illustrating a relationship between a capacitance and a value of a load in the load modulation circuit and a graph schematically illustrating a relationship between the value of the load and the amplitude of an alternating current voltage input to a power transmission power transmission antenna.

FIG. 21 indicates a graph schematically illustrating a relationship between a capacitance and a value of a load in the load modulation circuit 275 and a graph schematically illustrating a relationship between the value of the load and the amplitude of an alternating current voltage input to the power transmission power transmission antenna 140. As illustrated in the figure, the value of the load increases as the capacitance increases, and the amplitude of the alternating current voltage input to the power transmission power transmission antenna 140 decreases as the value of the load increases. The reverse control circuit 298, therefore, instructs the amplitude modulator 270 to cancel changes in the amplitude of the voltage caused by load modulation performed in the power reception apparatus 300. Upon receiving the instruction, the amplitude modulator 270 cancels the changes in the amplitude of the voltage by relatively increasing the value of the load when the received data is 1, by relatively decreasing the value of the load when the received data is 0, or by performing both. It is to be noted that a lower part of FIG. 21 is a diagram illustrating a state before the instruction is issued.

As a result of the above operation, when the power reception apparatus 300 transmits data to the relay apparatus 200 through amplitude modulation, the relay apparatus 200 can avoid propagation of an effect to the power transmission apparatus 100 in the previous stage. As a result, independence of data communication can be maintained.

It is to be noted that although the reverse control circuit 298, the amplitude modulator 270, and the relay control circuit 250 are separate components in the present embodiment, these components may be achieved by a single circuit (e.g., an MCU), instead. Alternatively, at least a part of these components may be arranged in an apparatus outside the relay apparatus 200.

Figure 22:
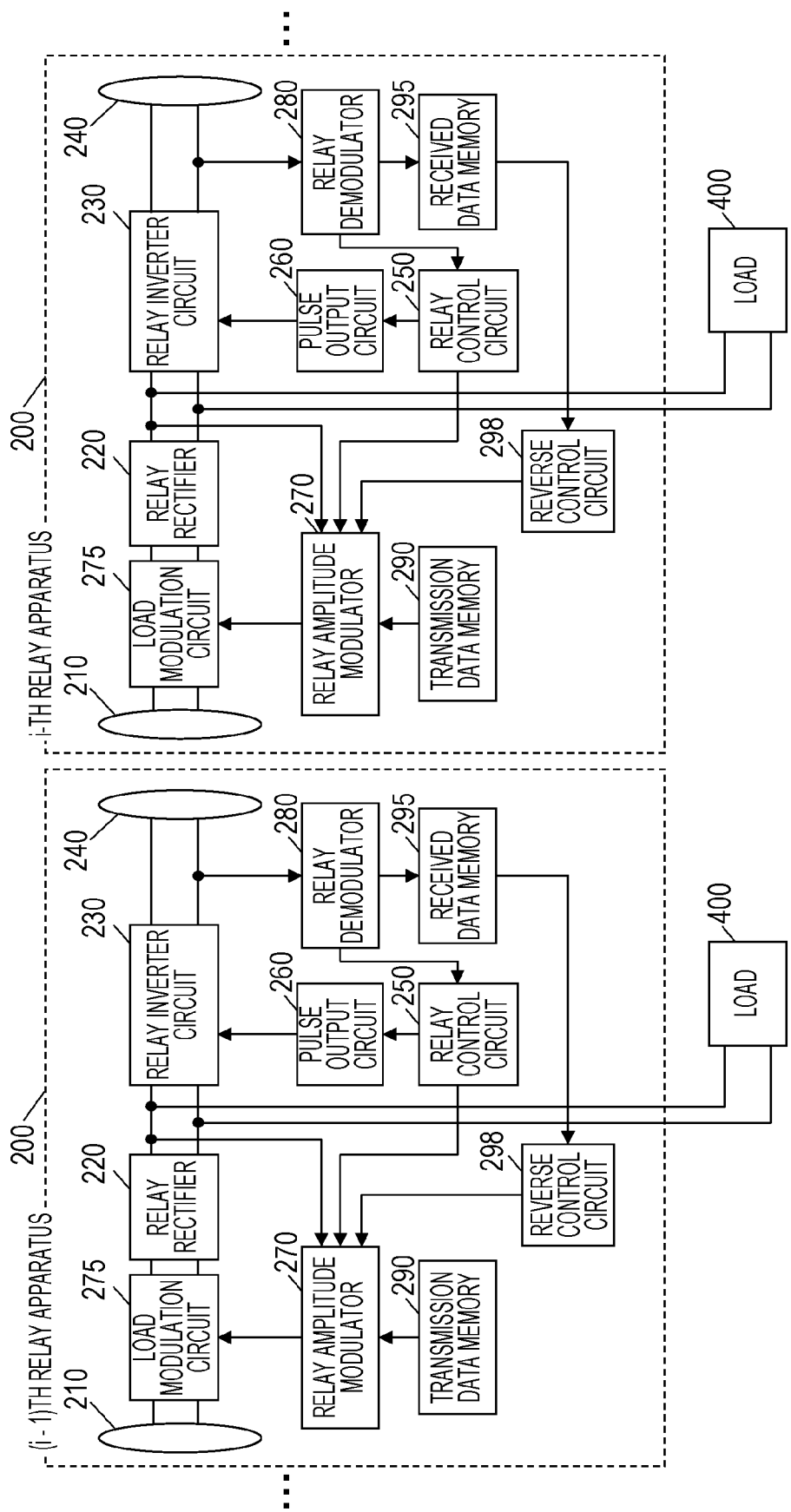
FIG. 22 is a diagram illustrating a modification of the second embodiment.

In the present embodiment, too, a plurality of relay apparatuses 200 may be provided between the power transmission apparatus 100 and the power reception apparatus 300. FIG. 22 is a diagram illustrating an example of a wireless power transmission system including a plurality of relay apparatuses 200. In FIG. 22, an (i−1)th (i=2 to N) relay apparatus and an i-th relay apparatus among N (N is an integer equal to or larger than 2) relay apparatuses are illustrated. Each relay apparatus 200 has the same configuration as the relay apparatus 200 illustrated in FIG. 18. In addition, the power transmission apparatus 100 and the power reception apparatus 300 that are not illustrated in FIG. 22 have the same configurations as those illustrated in FIG. 18.

The reverse control circuit 298 of each relay apparatus 200 performs, as described above, control for eliminating variation in the amplitude of the voltage when data is received. As a result, it becomes possible to avoid propagation, to another relay apparatus or the power transmission apparatus 100, of an effect of transmission of data to a certain relay apparatus 200.

Third Embodiment

Figure 23:
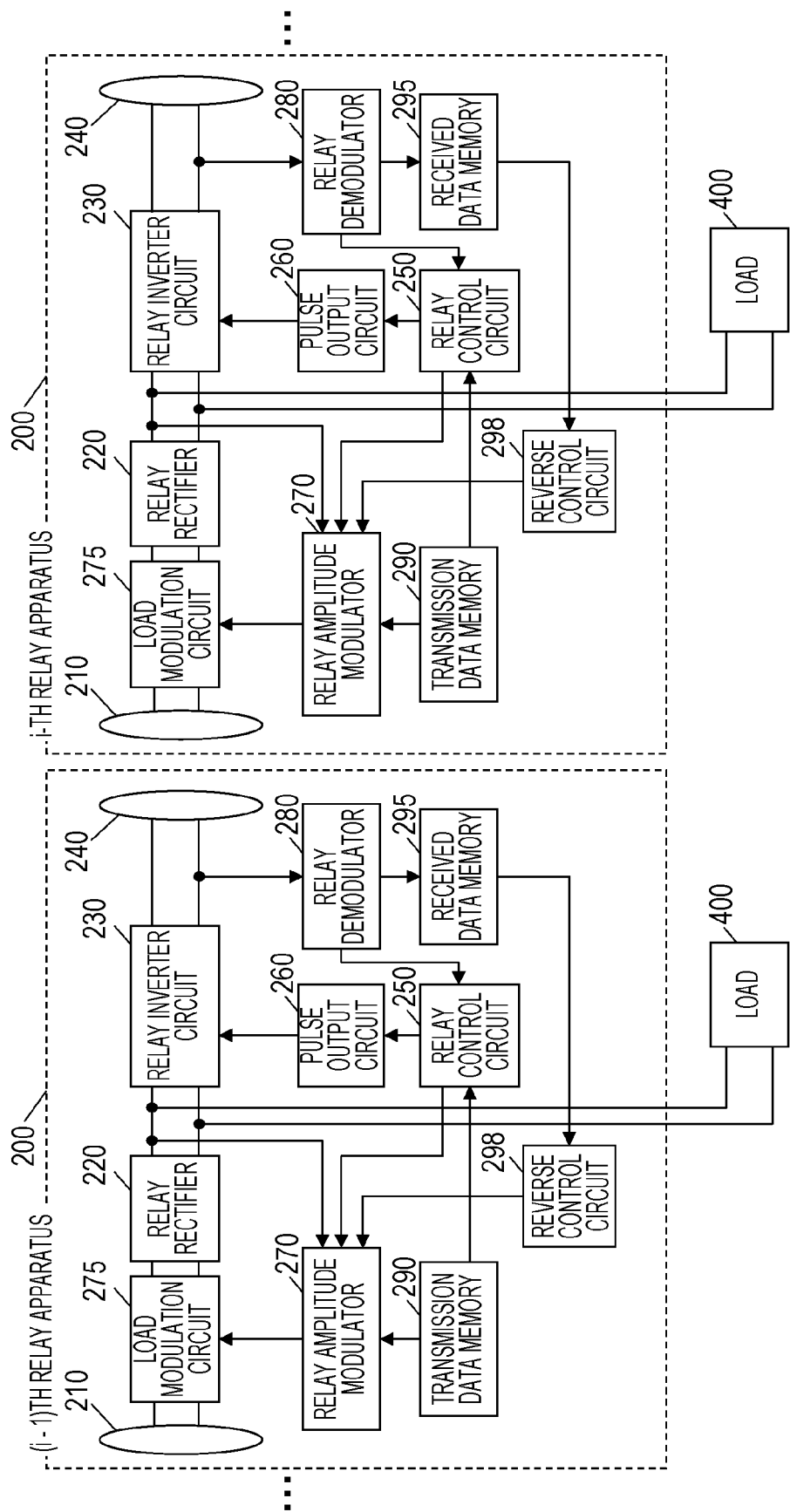
FIG. 23 is a diagram illustrating a plurality of relay apparatuses according to a third embodiment.

FIG. 23 is a diagram illustrating a plurality of relay apparatuses 200 according to a third embodiment. The relay apparatuses 200 according to the present embodiment are different from those according to the first and second embodiments in that the relay apparatuses 200 according to the present embodiment perform both the control at the time of data transmission according to the first embodiment and the control at the time of data reception according to the second embodiment.

As illustrated in FIG. 23, the relay apparatuses 200 according to the present embodiment each include a reverse control circuit 298 and performs the reverse control based on received data described in the second embodiment. Furthermore, as described in the first embodiment, the relay control circuit 250 controls the relay inverter circuit 230 on the basis of transmission data. By performing both types of control, an effect upon another apparatus can be suppressed both when data is transmitted and when data is received. The two problems described with reference to FIGS. 4 and 5, therefore, can both be solved.

Figure 24:
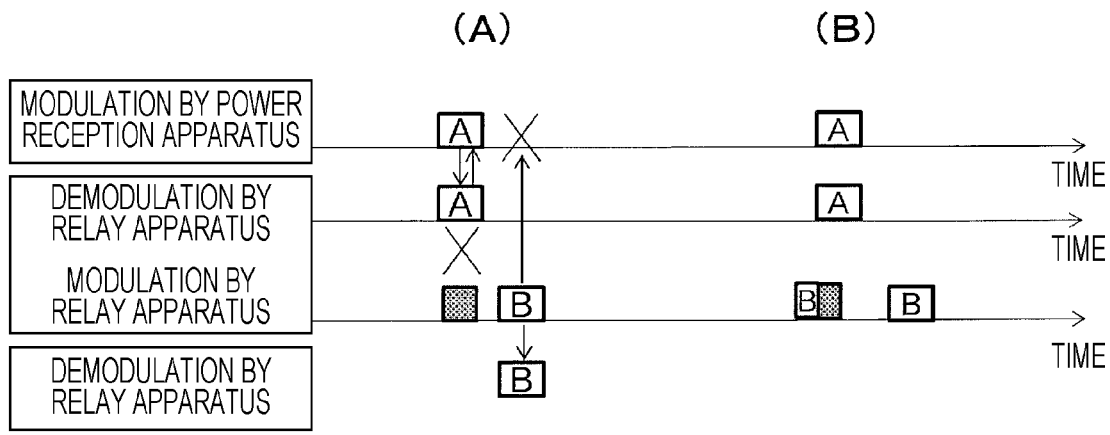
FIG. 24 is a diagram illustrating a problem that control at the time of data transmission and control at the time of data reception are not performed at the same timing.

Although the relay apparatuses 200 according to the present embodiment perform both the control at the time of data transmission and the control at the time of data reception, the relay apparatuses 200 does not perform both types of control at the same timing. FIG. 24 is a diagram illustrating this problem. As illustrated in FIG. 24(A), when the power reception apparatus 300 transmits data A to a relay apparatus 200, the relay apparatus 200 performs the control employing the amplitude modulator 270 described in the second embodiment and does not transmit data to a relay apparatus in a previous stage. On the other hand, when the relay apparatus 200 transmits data B to the relay apparatus in the previous stage, the relay apparatus 200 performs the control employing the inverter circuit 230 described in the first embodiment, and the power reception apparatus does not transmit data to the relay apparatus 200.

The relay control circuit 250 according to the present embodiment, therefore, transmits a timing control signal instructing the relay amplitude modulator 270 to start to transmit binary transmission data and performs control for avoiding overlapping of a transmission period in which the relay amplitude modulator 270 transmits transmission data and a reception period in which the relay demodulator 280 receives received data.

In the present embodiment, timing control in which reception of data from a subsequent stage takes priority over transmission of data to a previous stage is performed. This is because information from a power reception side is more important in terms of stable transmission of power. As illustrated in FIG. 24(B), for example, if data A is transmitted from an apparatus in a subsequent stage (the power reception apparatus 300 or another relay apparatus 200) while the relay apparatus 200 is transmitting data B, the transmission of data B stops. In addition, if data B is to be transmitted while data A is being transmitted from the apparatus in the subsequent stage, the transmission of data B is suspended until the transmission of data A is completed.

Figure 25:
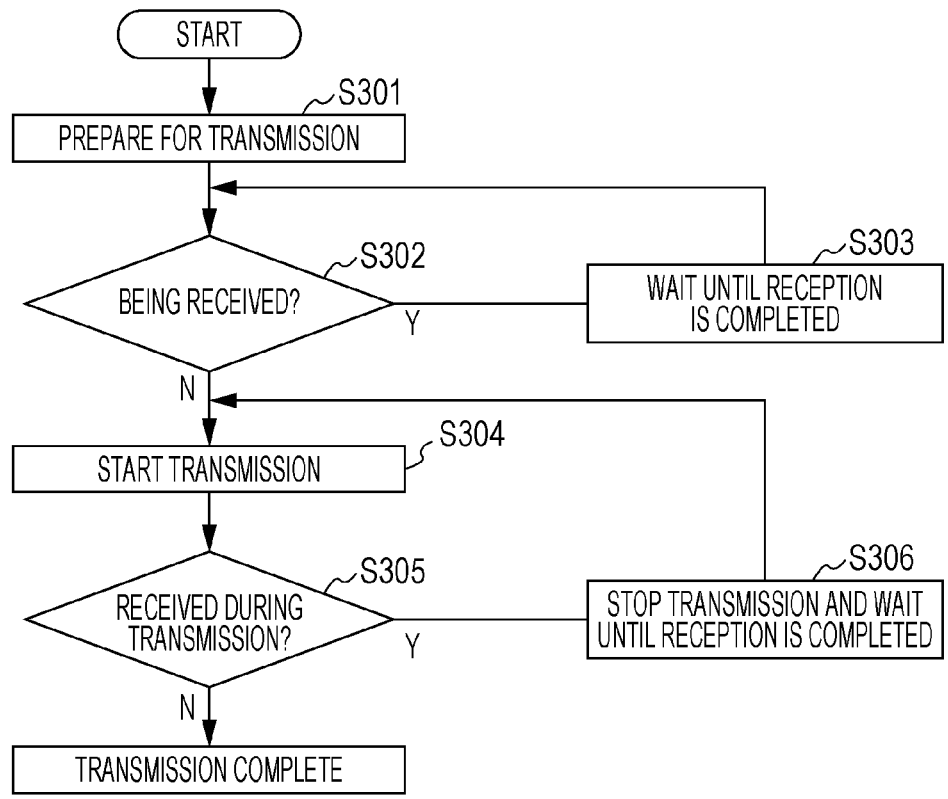
FIG. 25 is a flowchart illustrating an example of operations according to the third embodiment.

FIG. 25 is a flowchart illustrating an example of operations according to the present embodiment. First, the relay control circuit 250 prepares for transmission of data to an apparatus in a previous stage (step S301). At this time, the relay control circuit 250 determines whether data is being received from an apparatus in a subsequent stage (step S302). If data is being received, the relay control circuit 250 waits until the reception is completed (step S303). If data is not being received, the relay control circuit 250 starts the transmission to the apparatus in the previous stage (step S304). The relay control circuit 250 determines as necessary whether data has been received from the apparatus in the subsequent stage during the transmission (step S305). If data has been received, the relay control circuit 250 stops the transmission and waits until the reception is completed (step S306). If data has not been received, the relay control circuit 250 continues and completes the transmission.

As a result of the above operations, interference between data transmission and data reception is prevented, and preferable communication in which reception of data from a subsequent stage takes priority can be achieved.

As described above, the present disclosure includes wireless power transmission systems and power transmission apparatuses described in the following items.

Item 1

A wireless power transmission system including:
a power transmission apparatus;
a power reception apparatus; and
a relay apparatus arranged between the power transmission apparatus and the power reception apparatus,
in which the power transmission apparatus includes
a power transmission inverter circuit that converts power transmission direct current power supplied from an external power supply into power transmission alternating current power, and
a power transmission power transmission antenna that wirelessly transmits the obtained power transmission alternating current power,
in which the relay apparatus includes
a relay power reception antenna that is electromagnetically coupled with the power transmission power transmission antenna and that receives the transmitted power transmission alternating current power,
a relay rectifier that converts the received power transmission alternating current power into relay direct current power,
a relay inverter circuit that converts the relay direct current power into relay alternating current power, and
a relay power transmission antenna that wirelessly transmits the obtained relay alternating current power,
in which the power reception apparatus includes
a power reception power reception antenna that is electromagnetically coupled with the relay power transmission antenna and that receives the transmitted relay alternating current power,
a power reception rectifier that converts the relay alternating current power received by the power reception power reception antenna into power reception direct current power, and
a power reception amplitude modulator that transmits binary power reception transmission data to the relay apparatus through the electromagnetic coupling between the power reception power reception antenna and the relay power reception antenna by varying amplitude of voltage of the relay alternating current power received by the power reception power reception antenna between a first amplitude and a second amplitude, and
in which the relay apparatus also includes
a relay demodulator that is connected to the relay power transmission antenna and that receives binary relay received data by demodulating the binary power reception transmission data on the basis of a change in the voltage of the relay alternating current power input to the relay power transmission antenna, and
a relay reverse control circuit that reverses a sign of the binary relay received data received by the relay demodulator and that performs, using the relay amplitude modulator, control for eliminating a difference between a first voltage of the relay direct current power, which corresponds to the first amplitude, and a second voltage of the relay direct current power, which corresponds to the second amplitude, on the basis of the reversed binary relay received data.

Item 2

The wireless power transmission system according to Item 1,
in which the binary power reception transmission data is transmission data representing a power value of the power reception direct current power.

Item 3
A wireless power transmission system including:
a power transmission apparatus;
a power reception apparatus; and
N (N is an integer equal to or larger than 2) relay apparatuses that are arranged between the power transmission apparatus and the power reception apparatus and that are sorted as first to N-th relay apparatuses in descending order of closeness to the power transmission apparatus,
in which the power transmission apparatus includes
a power transmission inverter circuit that converts power transmission direct current power supplied from an external power supply into power transmission alternating current power, and
a power transmission power transmission antenna that wirelessly transmits the obtained power transmission alternating current power,
in which the first one of the N relay apparatuses includes
a first relay power reception antenna that is electromagnetically coupled with the power transmission power transmission antenna and that receives the transmitted power transmission alternating current power,
a first relay rectifier that converts the received power transmission alternating current power into first relay direct current power,
a first relay inverter circuit that converts the first relay direct current power into first relay alternating current power, and
a first relay power transmission antenna that wirelessly transmits the obtained first relay alternating current power,
in which an i-th (i=2 to N) one of the N relay apparatuses includes
an i-th relay power reception antenna that is electromagnetically coupled with an (i−1)th relay power transmission antenna and that receives (i−1)th relay alternating current power,
an i-th relay rectifier that converts the received (i−1)th relay alternating current power into i-th relay direct current power,
an i-th relay inverter circuit that converts the i-th relay direct current power into i-th relay alternating current power, and
an i-th relay power transmission antenna that wirelessly transmits the obtained i-th relay alternating current power,
in which the power reception apparatus includes
a power reception power reception antenna that is electromagnetically coupled with an N-th relay power transmission antenna and that receives N-th relay alternating current power, and
a power reception rectifier that converts the N-th relay alternating current power received by the power reception power reception antenna into power reception direct current power,
in which the first relay apparatus also includes
a first relay amplitude modulator that transmits binary first relay transmission data to the power transmission apparatus through the electromagnetic coupling between the first relay power reception antenna and the power transmission power transmission antenna by varying amplitude of voltage of the power transmission alternating current power received by the first relay power reception antenna between a first first amplitude and a first second amplitude,
in which the i-th (i=2 to N) relay apparatus also includes
an i-th relay amplitude modulator that transmits binary i-th relay transmission data to the (i−1)th relay apparatus through the electromagnetic coupling between the i-th relay power reception antenna and the (i−1)th relay power transmission antenna by varying amplitude of voltage of the (i−1)th relay alternating current power received by the i-th relay power reception antenna between an i-th first amplitude and an i-th second amplitude, and
in which the (i−1)th (i=2 to N) relay apparatus also includes
an (i−1)th relay demodulator that is connected to the (i−1)th relay power transmission antenna and that receives binary (i−1)th relay received data by demodulating the binary i-th relay transmission data on the basis of a change in the voltage of the (i−1)th relay alternating current power input to the (i−1)th relay power transmission antenna, and
an (i−1)th relay reverse control circuit that reverses a sign of the binary (i−1)th relay received data received by the (i−1)th relay demodulator and that performs, using the (i−1)th relay amplitude modulator, control for eliminating a difference between a first voltage of the (i−1)th relay direct current power, which corresponds to the i-th first amplitude, and a second voltage of the (i−1)th relay direct current power, which corresponds to the i-th second amplitude, on the basis of the reversed binary (i−1)th relay received data.

Item 4
The wireless power transmission system according to Item 3,
in which the power reception apparatus includes
a power reception amplitude modulator that transmits binary power reception transmission data to the N-th relay apparatus through the electromagnetic coupling between the power reception power reception antenna and the N-th relay power transmission antenna by varying amplitude of voltage of the N-th relay alternating current power received by the power reception power reception antenna between a third amplitude and a fourth amplitude, and
in which the N-th relay apparatus also includes
an N-th relay demodulator that is connected to the N-th relay power transmission antenna and that receives the binary power reception transmission data by demodulating the binary power reception transmission data on the basis of a change in voltage of the N-th relay alternating current power input to the N-th relay power transmission antenna, and
an N-th relay reverse control circuit that reverses a sign of the binary N-th relay received data received by the N-th relay demodulator and that performs, using the N-th relay amplitude modulator, control for eliminating a difference between a first voltage of the N-th relay direct current power, which corresponds to the third amplitude, and a second voltage of the N-th relay direct current power, which corresponds to the fourth amplitude, on the basis of the reversed binary N-th relay received data.

Item 5
The wireless power transmission system according to Item 4,
in which the binary power reception transmission data is transmission data representing a power value of the power reception direct current power.

Item 6
The wireless power transmission system according to any of Items 3 to 5,
in which the binary i-th (i=2 to N) relay transmission data is transmission data representing a power value of the i-th relay direct current power.

Item 7
The wireless power transmission system according to any of Items 3 to 6,
in which the i-th (i=2 to N) relay inverter circuit includes four switching elements, in which the four switching elements include a first switching element pair that, when conductive, outputs a voltage having the same polarity as voltage of the supplied i-th relay direct current power and a second switching element pair that, when conductive, outputs a voltage having an opposite polarity to the voltage of the supplied i-th relay direct current power, and in which the i-th relay control circuit supplies a pulse signal for switching a conductive and nonconductive state to each of the four switching elements, and adjusts amplitude of voltage of the i-th relay alternating current power output from the i-th relay inverter circuit by adjusting a phase difference between two pulse signals supplied to the first switching element pair and a phase difference between two pulse signals supplied to the second switching element pair.

Item 8

The wireless power transmission system according to any of Items 3 to 6, in which the i-th (i=2 to N) relay control circuit adjusts amplitude of voltage of the i-th relay alternating current power output from the i-th relay inverter circuit by changing frequency of the i-th relay alternating current power output from the i-th relay inverter circuit.

Item 9

The wireless power transmission system according to any of Items 3 to 6, in which the i-th (i=2 to N) relay inverter circuit includes a plurality of switching elements, and in which the i-th (i=2 to N) relay control circuit supplies a pulse signal for switching a conductive and nonconductive state to each of the plurality of switching elements, and adjusts amplitude of voltage of the i-th relay alternating current power output from the i-th relay inverter circuit by adjusting a duty ratio of the pulse signal.

The techniques in the present disclosure can be used, for example, in devices necessary to transmit data while supplying power, such as monitoring cameras and robots.

What is claimed is:

1. A wireless power transmission system comprising:
a power transmission apparatus;
a power reception apparatus; and
a relay apparatus arranged between the power transmission apparatus and the power reception apparatus,
wherein the power transmission apparatus includes
a power transmission inverter circuit that converts power transmission direct current power supplied from an external power supply into power transmission alternating current power, and
a power transmission power transmission antenna that wirelessly transmits the power transmission alternating current power,
wherein the relay apparatus includes
a relay power reception antenna that is electromagnetically coupled with the power transmission power transmission antenna and that receives the transmitted power transmission alternating current power,
a relay rectifier that converts the received power transmission alternating current power into relay direct current power,
a relay inverter circuit that converts the relay direct current power into relay alternating current power, and
a relay power transmission antenna that wirelessly transmits the obtained relay alternating current power,
wherein the power reception apparatus includes a power reception power reception antenna that is electromagnetically coupled with the relay power transmission antenna and that receives the transmitted relay alternating current power,
a power reception rectifier that converts the relay alternating current power received by the power reception power reception antenna into power reception direct current power, and
a power reception amplitude modulator that transmits binary power reception transmission data to the relay apparatus through the electromagnetic coupling between the power reception power reception antenna and the relay power reception antenna by varying amplitude of voltage of the relay alternating current power received by the power reception power reception antenna between a first amplitude and a second amplitude, and
wherein the relay apparatus also includes
a relay demodulator that is connected to the relay power transmission antenna and that receives binary relay received data by demodulating the binary power reception transmission data on the basis of a change in the voltage of the relay alternating current power input to the relay power transmission antenna, and
a relay reverse control circuit that reverses a sign of the binary relay received data received by the relay demodulator and that causes the relay amplitude modulator to eliminate a difference between a first voltage of the relay direct current power, which corresponds to the first amplitude, and a second voltage of the relay direct current power, which corresponds to the second amplitude, on the basis of the reversed binary relay received data.

2. The wireless power transmission system according to claim 1,
wherein the binary power reception transmission data is transmission data representing a power value of the power reception direct current power.

3. A wireless power transmission system comprising:
a power transmission apparatus;
a power reception apparatus; and
N (N is an integer equal to or larger than 2) relay apparatuses that are arranged between the power transmission apparatus and the power reception apparatus and that are sorted as first to N-th relay apparatuses in descending order of closeness to the power transmission apparatus,
wherein the power transmission apparatus includes
a power transmission inverter circuit that converts power transmission direct current power supplied from an external power supply into power transmission alternating current power, and
a power transmission power transmission antenna that wirelessly transmits the power transmission alternating current power,
wherein the first one of the N relay apparatuses includes
a first relay power reception antenna that is electromagnetically coupled with the power transmission power transmission antenna and that receives the transmitted power transmission alternating current power,
a first relay rectifier that converts the received power transmission alternating current power into first relay direct current power,
a first relay inverter circuit that converts the first relay direct current power into first relay alternating current power, and a first relay power transmission antenna that wirelessly transmits the obtained first relay alternating current power, wherein an i-th (i=2 to N) one of the N relay apparatuses includes an i-th relay power reception antenna that is electromagnetically coupled with an (i−1)th relay power transmission antenna and that receives (i−1)th relay alternating current power, an i-th relay rectifier that converts the received (i−1)th relay alternating current power into i-th relay direct current power, an i-th relay inverter circuit that converts the i-th relay direct current power into i-th relay alternating current power, and an i-th relay power transmission antenna that wirelessly transmits the obtained i-th relay alternating current power, wherein the power reception apparatus includes a power reception power reception antenna that is electromagnetically coupled with an N-th relay power transmission antenna and that receives N-th relay alternating current power, and a power reception rectifier that converts the N-th relay alternating current power received by the power reception power reception antenna into power reception direct current power, wherein the first relay apparatus also includes a first relay amplitude modulator that transmits binary first relay transmission data to the power transmission apparatus through the electromagnetic coupling between the first relay power reception antenna and the power transmission power transmission antenna by varying amplitude of voltage of the power transmission alternating current power received by the first relay power reception antenna between a first first amplitude and a first second amplitude, wherein the i-th (i=2 to N) relay apparatus also includes an i-th relay amplitude modulator that transmits binary i-th relay transmission data to the (i−1)th relay apparatus through the electromagnetic coupling between the i-th relay power reception antenna and the (i−1)th relay power transmission antenna by varying amplitude of voltage of the (i−1)th relay alternating current power received by the i-th relay power reception antenna between an i-th first amplitude and an i-th second amplitude, and wherein the (i−1)th (i=2 to N) relay apparatus also includes an (i−1)th relay demodulator that is connected to the (i−1)th relay power transmission antenna and that receives binary (i−1)th relay received data by demodulating the binary i-th relay transmission data on the basis of a change in the voltage of the (i−1)th relay alternating current power input to the (i−1)th relay power transmission antenna, and an (i−1)th relay reverse control circuit that reverses a sign of the binary (i−1)th relay received data received by the (i−1)th relay demodulator and that causes the (i−1)th relay amplitude modulator to eliminate a difference between a first voltage of the (i−1)th relay direct current power, which corresponds to the i-th first amplitude, and a second voltage of the (i−1)th relay direct current power, which corresponds to the i-th second amplitude, on the basis of the reversed binary (i−1)th relay received data.

4. The wireless power transmission system according to claim 3, wherein the power reception apparatus includes a power reception amplitude modulator that transmits binary power reception transmission data to the N-th relay apparatus through the electromagnetic coupling between the power reception power reception antenna and the N-th relay power transmission antenna by varying amplitude of voltage of the N-th relay alternating current power received by the power reception power reception antenna between a third amplitude and a fourth amplitude, and wherein the N-th relay apparatus also includes an N-th relay demodulator that is connected to the N-th relay power transmission antenna and that receives the binary power reception transmission data by demodulating the binary power reception transmission data on the basis of a change in voltage of the N-th relay alternating current power input to the N-th relay power transmission antenna, and an N-th relay reverse control circuit that reverses a sign of the binary N-th relay received data received by the N-th relay demodulator and that performs, using the N-th relay amplitude modulator, control for eliminating a difference between a first voltage of the N-th relay direct current power, which corresponds to the third amplitude, and a second voltage of the N-th relay direct current power, which corresponds to the fourth amplitude, on the basis of the reversed binary N-th relay received data.

5. The wireless power transmission system according to claim 4, wherein the binary power reception transmission data is transmission data representing a power value of the power reception direct current power.

6. The wireless power transmission system according to claim 3, wherein the binary i-th (i=2 to N) relay transmission data is transmission data representing a power value of the i-th relay direct current power.

7. The wireless power transmission system according to claim 3, wherein the i-th (i=2 to N) relay inverter circuit includes four switching elements, wherein the four switching elements include a first switching element pair that, when conductive, outputs a voltage having the same polarity as voltage of the supplied i-th relay direct current power and a second switching element pair that, when conductive, outputs a voltage having an opposite polarity to the voltage of the supplied i-th relay direct current power, and wherein the i-th relay control circuit supplies a pulse signal for switching a conductive and nonconductive state to each of the four switching elements, and adjusts amplitude of voltage of the i-th relay alternating current power output from the i-th relay inverter circuit by adjusting a phase difference between two pulse signals supplied to the first switching element pair and a phase difference between two pulse signals supplied to the second switching element pair.

8. The wireless power transmission system according to claim 3, wherein the i-th (i=2 to N) relay control circuit adjusts amplitude of voltage of the i-th relay alternating current power output from the i-th relay inverter circuit by changing frequency of the i-th relay alternating current power output from the i-th relay inverter circuit.

9. The wireless power transmission system according to claim 3,
wherein the i-th (i=2 to N) relay inverter circuit includes a plurality of switching elements, and
wherein the i-th (i=2 to N) relay control circuit
supplies a pulse signal for switching a conductive and nonconductive state to each of the plurality of switching elements, and
adjusts amplitude of voltage of the i-th relay alternating current power output from the i-th relay inverter circuit by adjusting a duty ratio of the pulse signal.

* * * * *